(12) United States Patent
Li et al.

(10) Patent No.: US 11,095,812 B2
(45) Date of Patent: Aug. 17, 2021

(54) IMAGE PROCESSING METHOD, APPARATUS, AND DEVICE

(71) Applicant: HUAWEI TECHNOLOGIES CO., LTD., Guangdong (CN)

(72) Inventors: An Li, Shenzhen (CN); Qingping Wang, Shenzhen (CN); Tizheng Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/723,554

(22) Filed: Dec. 20, 2019

(65) Prior Publication Data

US 2020/0137302 A1    Apr. 30, 2020

Related U.S. Application Data

(63) Continuation of application No. PCT/CN2018/084518, filed on Apr. 25, 2018.

(30) Foreign Application Priority Data

Jun. 23, 2017  (CN) .......................... 201710488848.7
Nov. 30, 2017  (CN) .......................... 201711243255.0

(51) Int. Cl.
*H04N 5/232* (2006.01)
*H04N 5/247* (2006.01)
(Continued)

(52) U.S. Cl.
CPC ..... *H04N 5/23229* (2013.01); *H04N 5/23299* (2018.08); *H04N 5/247* (2013.01)

(58) Field of Classification Search
CPC ........... H04N 5/23232; H04N 5/23229; H04N 5/2258

See application file for complete search history.

(56) References Cited

U.S. PATENT DOCUMENTS 8,922,625 B2  12/2014 Kim et al.
2007/0084927 A1  4/2007 Itou et al.
(Continued)

FOREIGN PATENT DOCUMENTS

CN    1949833 A    4/2007
CN    101183175 A  5/2008
(Continued)

*Primary Examiner* — Christopher K Peterson
(74) *Attorney, Agent, or Firm* — Womble Bond Dickinson (US) LLP

(57) ABSTRACT

An embodiment of the present invention discloses an image processing method, an apparatus, and a device. The method is applied to a terminal having two specially manufactured cameras. A first sub-image that is of a to-be-photographed object and that is photographed by a first camera is obtained, where a corresponding field-of-view range is $[0, \theta_1]$; a second sub-image that is of the to-be-photographed object and that is photographed by a second camera is obtained, where a corresponding field-of-view range is $[\theta_2, \theta_3]$, and quality of the first sub-image and the second sub-image satisfies a definition requirement of an extra-large aperture; and the first sub-image and the second sub-image are spliced and fused to obtain a target image that has a larger field-of-view range and satisfies the extra-large aperture.

18 Claims, 7 Drawing Sheets

(51) Int. Cl.
    *G02B 13/00*     (2006.01)
    *G02B 9/62*     (2006.01)
    *G02B 7/28*     (2021.01)
    *H04N 5/262*     (2006.01)
    *H04N 5/225*     (2006.01)

(56) References Cited

U.S. PATENT DOCUMENTS

| | | | |
|---|---|---|---|
| 2010/0238327 A1* | 9/2010 | Griffith | H04N 5/232 |
| | | | 348/240.99 |
| 2012/0114264 A1 | 5/2012 | Shmunk et al. | |
| 2015/0312450 A1* | 10/2015 | Park | H04N 5/232 |
| | | | 348/335 |
| 2016/0261793 A1 | 9/2016 | Sivan | |
| 2016/0381260 A1* | 12/2016 | Narayanswamy | H04N 5/2258 |
| | | | 348/360 |
| 2017/0132774 A1* | 5/2017 | Ruprecht | H04N 5/23299 |

FOREIGN PATENT DOCUMENTS

| | | |
|---|---|---|
| CN | 102472946 A | 5/2012 |
| CN | 103618881 A | 3/2014 |
| CN | 105120145 A | 12/2015 |
| CN | 105262951 A | 1/2016 |
| CN | 105338244 A | 2/2016 |
| CN | 105611186 A | 5/2016 |
| CN | 106161980 A | 11/2016 |
| CN | 106570110 A | 4/2017 |
| CN | 106713716 A | 5/2017 |
| CN | 107295256 A | 10/2017 |
| WO | 2012057619 A1 | 5/2012 |
| WO | 2015163671 A1 | 10/2015 |

* cited by examiner

IMAGE PROCESSING METHOD, APPARATUS, AND DEVICE

CROSS-REFERENCE TO RELATED APPLICATIONS

This application is a continuation of International Application No. PCT/CN2018/084518, filed on Apr. 25, 2018, which claims priority to Chinese Patent Application No. 201710488848.7, filed on Jun. 23, 2017 and Chinese Patent Application No. 201711243255.0, filed on Nov. 30, 2017. The disclosures of the aforementioned applications are hereby incorporated by reference in their entireties.

TECHNICAL FIELD

The present invention relates to the field of terminal technologies, and in particular, to an image processing method, apparatus, and device.

BACKGROUND

F-number (FNO)=Focal length/Entrance pupil diameter is a system parameter of a shooting lens, and determines an amount of light admitted to the lens. As the f-number decreases, an aperture increases, and the amount of admitted light becomes larger. On the contrary, as the f-number increases, the aperture decreases, and the amount of admitted light becomes smaller. In addition, the aperture also determines a limiting resolution of the lens. As the aperture increases, the resolution becomes higher. On the contrary, as the aperture decreases, the resolution becomes lower. The f-number of the lens directly affects shooting quality, for example, luminance, resolving power, and a dark environment imaging capability.

Therefore, to obtain higher shooting quality and better user experience, there is an ever-growing demand for an extra-large aperture lens in a portable terminal device such as a mobile phone or a tablet. The extra-large aperture mentioned in the industry means a smallest possible f-number. Currently, a design of approximately six lenses is generally used for a high-end mobile phone lens, and an f-number is generally: FNO>1.7. As shown in FIG. 1, a conventional shooting lens has a six-lens structure, to ensure relatively ideal imaging within an entire field of view (FOV) of the lens. A lens design system obtains a quantity of lenses based on an empirical value and a user's f-number requirement, and then calculates parameters such as a positional relationship between lenses, a focal length, and a shape according to the principles of physics and mathematical principles, to perform a production process to form a finished product through configuration.

According to experience in the prior art, as the aperture increases, an aberration of an imaging beam is larger, and more lenses are needed to correct the aberration; and as the quantity of lenses increases, a degree of optical deviation caused by assembly difficulty is greater, and then an optical system becomes very sensitive, failing to ensure that a clear image can be photographed within an entire field-of-view range. Therefore, to ensure that a clear image can be photographed within the entire field-of-view range, difficulties in optical design and hardware assembly of a plurality of lenses increase exponentially and the lenses are more difficult to manufacture. This raises a very high management and control requirement on a production process. Therefore, to obtain a large aperture and enable a single lens to perform clear imaging within an entire field of view of the shooting lens, a quantity of lenses that a current process can implement is generally not greater than 6. According to the current technological level in the industry, the FNO can be greater than 1.6. For a lens with a large aperture (where the FNO is less than or equal to 1.6), according to the current technological level, there is a low yield rate and high costs for manufacturing. This is not conducive to integration of the lens into a portable terminal device such as a mobile phone or a tablet.

Therefore, how to implement an extra-large aperture of a lens while taking a production process into account is a problem that needs to be urgently resolved.

SUMMARY

Embodiments of the present invention provide a photographing module and a terminal, to implement a large aperture with FNO<1.6 by using two cameras or a plurality of cameras and also considering a production process level, so that the photographing module and the terminal become a simple and effective way of implementing a large aperture.

Specific technical solutions provided in the embodiments of the present invention are as follows:

According to a first aspect, an embodiment of the present invention provides an image processing method, where the method is applied to a photographing device including a first camera and a second camera, optical axes of the first camera and the second camera are parallel to each other, a spacing between the first camera and the second camera is less than a preset distance, and f-numbers of the first camera and the second camera are less than 1.6. The method includes: obtaining a first image that is of a to-be-photographed object and that is photographed by the first camera; obtaining a second image that is of the to-be-photographed object and that is photographed by the second camera; obtaining a first sub-image of the first image based on a preset first rule, where a field-of-view range of the first camera corresponding to the first sub-image is [0, $\theta_1$], and obtaining a second sub-image of the second image based on a preset second rule, where a field-of-view range of the second camera corresponding to the second sub-image is [$\theta_2$, $\theta_3$], $0<\theta_2<\theta_1<\theta_3$, and there is an image overlapping between the first sub-image and the second sub-image; and performing processing on the first sub-image and the second sub-image based on a preset splicing algorithm, to obtain a target image.

According to a second aspect, an embodiment of the present invention provides an image processing apparatus, where the apparatus is applied to a photographing device including a first camera and a second camera, optical axes of the first camera and the second camera are parallel to each other, a spacing between the first camera and the second camera is less than a preset distance, and f-numbers of the first camera and the second camera are less than 1.6. The apparatus includes: a first obtaining module, configured to obtain a first image that is of a to-be-photographed object and that is photographed by the first camera; a second obtaining module, configured to obtain a second image that is of the to-be-photographed object and that is photographed by the second camera; a third obtaining module, configured to obtain a first sub-image of the first image based on a preset first rule, where a field-of-view range of the first camera corresponding to the first sub-image is [0, $\theta_1$]; a fourth obtaining module, configured to obtain a second sub-image of the second image based on a preset second rule, where a field-of-view range of the second camera corresponding to the second sub-image is [$\theta_2$, $\theta_3$], $0<\theta_2<\theta_1<\theta_3$, and there is an image overlapping between the first sub-image and the second sub-image; and an image splicing module, configured to perform processing on the first sub-image and the second sub-image based on a preset splicing algorithm, to obtain a target image.

(Note: In this application, if a field-of-view range is Ø (where Ø may be any angle), the field-of-view range may be expressed as [0, ½ Ø], indicating that a lens is a starting point, an optical axis is a center, and a range of an angle of a conical region projected onto a plane is [−½ Ø, ½ Ø], where the conical region is formed by all rays at an angle of ½ Ø to the optical axis.

According to the technical solutions of the foregoing method and apparatus provided in the embodiments of the present invention, a task of imaging with an extra-large aperture can be undertaken by two cameras. A high-definition region under the condition of an extra-large aperture, namely, the first sub-image, is obtained by using the first camera based on a specific algorithm; then a high-definition region under the condition of an extra-large aperture, namely, the second sub-image, is obtained by using the second camera based on a specific algorithm; and the first sub-image and the second sub-image are spliced and fused, to obtain a target image that satisfies high definition within an entire field-of-view range. In this way, under the premise of implementing an extra-large aperture, difficulties in designing and manufacturing a camera are reduced, and designing and manufacturing costs are reduced.

In one embodiment, the obtaining a first sub-image of the first image based on a preset first rule includes: obtaining first parameter information of the first camera, where the first parameter information indicates that a modulation transfer function (MTF) value corresponding to an image photographed by the first camera in a field-of-view range of [0, $\theta_1$] at a preset spatial frequency is greater than a preset first threshold, where $\theta_1$ is less than ½ of a field of view of the first camera; obtaining an image receiving region P of an image sensor in the first camera; and determining, as the first sub-image, an image of a region S1 that is an intersection set between a region of the first image in the field-of-view range of [0, $\theta_1$] and P.

More specifically, this technical solution may be implemented by a processor invoking a program and an instruction in a memory to perform a corresponding operation.

In one embodiment, the obtaining a second sub-image of the second image based on a preset second rule includes: obtaining second parameter information of the second camera, where the second parameter information indicates that an MTF value corresponding to an image photographed by the second camera in a field-of-view range of [$\theta_2$, $\theta_3$] at the preset spatial frequency is greater than a preset second threshold, where $0<\theta_2<\theta_1$, and $\theta_3$ is less than or equal to ½ of a field of view of the second camera; obtaining a second image receiving region Q of an image sensor in the second camera; and determining, as the second sub-image, an image of a region S2 that is an intersection set between a region of the second image in the field-of-view range of [$\theta_2$, $\theta_3$] and Q.

More specifically, this technical solution may be implemented by a processor invoking a program and an instruction in a memory to perform a corresponding operation.

In one embodiment, the performing processing on the first sub-image and the second sub-image based on a preset splicing algorithm, to obtain a target image includes: determining an image of a region S3 that is an intersection set between S1 and S2; determining an image of a region S32 that is a complementary set of S3 in S2; and performing processing on the image of S1 and the image of S32 based on a preset first splicing algorithm, to obtain the target image.

More specifically, this technical solution may be implemented by a processor invoking a program and an instruction in a memory to perform a corresponding operation.

In one embodiment, the performing processing on the first sub-image and the second sub-image based on a preset splicing algorithm, to obtain a target image includes: determining an image of a region S3 that is an intersection set between S1 and S2; determining an image of a region S31 that is a complementary set of S3 in S1; and performing processing on the image of S31 and the image of S2 based on a preset second splicing algorithm, to obtain the target image.

More specifically, this technical solution may be implemented by a processor invoking a program and an instruction in a memory to perform a corresponding operation.

In one embodiment, the performing processing on the first sub-image and the second sub-image based on a preset splicing algorithm, to obtain a target image includes: determining an image of a region S3 that is an intersection set between S1 and S2; determining an image of a region S31 that is a complementary set of S3 in S1; determining an image of a region S32 that is a complementary set of S3 in S2; performing, by using the image of S1 and the image of S2, enhancement processing on the image of S3 based on a preset enhancement algorithm, to obtain an image of S4; and performing processing on the image of S31, the image of S32, and the image of S4 based on a preset third splicing algorithm, to obtain the target image.

More specifically, this technical solution may be implemented by a processor invoking a program and an instruction in a memory to perform a corresponding operation.

In one embodiment, the first camera includes a first imaging lens, and the second camera includes a second imaging lens; the first imaging lens is obtained by designing according to a preset first requirement, and the second imaging lens is obtained by designing according to a preset second requirement; and the preset first requirement corresponds to the first parameter information, and the preset second requirement corresponds to the second parameter information.

More specifically, the data about properties of imaging lenses that are manufactured based on these design requirements is stored in advance in a photographing device or a server, and the data can be invoked by a processor during subsequent image processing, to determine the first sub-image from the first image and determine the second sub-image from the second image.

In one embodiment, the obtaining a first image that is of a to-be-photographed object and that is photographed by the first camera and the obtaining a second image that is of the to-be-photographed object and that is photographed by the second camera are triggered by a same trigger signal, or are triggered separately by two different trigger signals.

In one embodiment, a quantity of lenses included in an imaging lens of the first camera and a quantity of lenses included in an imaging lens of the second camera are 4, 5, or 6.

In one embodiment, the f-numbers of the first camera and the second camera are the same.

In one embodiment, the image sensors of the first camera and the second camera are the same. Therefore, correspondingly the foregoing P and the foregoing Q are also the same.

In one embodiment, the first camera and the second camera have a same focal length and a same (maximum) field of view.

In one embodiment, the preset first threshold and the preset second threshold are greater than or equal to 0.25.

In one embodiment, the preset spatial frequency is greater than 400 line pairs/mm. Generally, for a same image, as the spatial frequency increases, corresponding precision of the image is higher. As the spatial frequency increases, an MTF value can be greater than a preset threshold, indicating that definition of the image is better.

In one embodiment, S1 is a circular region.

In one embodiment, due to an error brought by device manufacturing and an environment in which a camera is located, an image region corresponding to the foregoing field-of-view range, such as $[0, \theta_1]$ or $[\theta_2, \theta_3]$, is not necessarily a regular circle or circular ring, but may be an approximate circle or circular ring or may be some irregular patterns, provided that, under the premise of taking a same image sensor as a reference, all high-definition sub-images finally obtained by the camera can cover a region in which the image sensor is located. In this way, seamless splicing can be implemented, to form a high-definition target image that satisfies an extra-large aperture.

In one embodiment, in a process of determining a sub-image, in the foregoing field-of-view range such as $[0, \theta_1]$ or $[\theta_2, \theta_3]$, an image processing program may alternatively take a local part of the foregoing two regions, for example, an image of a square, elliptical, or non-circular region, to perform corresponding splicing, provided that a union set of these sub-images can cover a region in which an image sensor is located.

In one embodiment, the photographing device further includes an adjustment apparatus, and the method further includes: controlling the adjustment apparatus to adjust the spacing between the first camera and the second camera. If the to-be-photographed object is closer to a lens, the spacing between the two cameras needs to be smaller, to ensure that obtained sub-image regions can be overlapped. If the to-be-photographed object is farther from a lens, the spacing between the two cameras needs to be slightly greater, so that obtained sub-images are overlapped and an overlapping region is not oversized.

In one embodiment, the photographing device further includes a third camera, where an optical axis of the third camera and an optical axis of the first camera are parallel to each other; a spacing between the third camera and the first camera is less than the preset distance; and a spacing between the third camera and the second camera is less than the preset distance. The method further includes: obtaining a third image that is of the to-be-photographed object and that is photographed by the third camera; and obtaining a third sub-image of the second image based on a preset third rule, where a field-of-view range of the third camera corresponding to the third sub-image is $[\theta_4, \theta_5]$, $\theta_2 < \theta_4 < \theta_3 < \theta_5$, there is an image overlapping between the second sub-image and the third sub-image, and $\theta_5$ is less than ½ of a field of view of the third camera. The performing processing on the first sub-image and the second sub-image based on a preset splicing algorithm, to obtain a target image includes: performing processing on the first sub-image, the second sub-image, and the third sub-image based on a preset fourth splicing algorithm, to obtain the target image.

In one embodiment, the obtaining a third sub-image of the third image based on a preset third rule includes:

obtaining third parameter information of the third camera, where the third parameter information indicates that an MTF value corresponding to an image photographed by the third camera in a field-of-view range of $[\theta_4, \theta_5]$ at the preset spatial frequency is greater than the preset third threshold, and $\theta_5$ is less than ½ of a field of view of the third camera;

obtaining an image receiving region R of an image sensor in the third camera; and determining, as the third sub-image, an image of a region S1' that is an intersection set between a region of the third image in the field-of-view range of $[\theta_4, \theta_5]$ and the R.

According to a third aspect, an embodiment of the present invention provides a terminal device. The terminal device includes a first camera, a second camera, a memory, a processor, and a bus. The first camera, the second camera, the memory, and the processor are connected by using the bus, where optical axes of the first camera and the second camera are parallel to each other, a spacing between the first camera and the second camera is less than a preset distance, and f-numbers of the first camera and the second camera are less than 1.6. The camera is configured to collect an image signal under the control of the processor; the memory is configured to store a computer program and an instruction; and the processor is configured to invoke the computer program and the instruction stored in the memory, to perform the method according to any one of the foregoing possible implementations.

In one embodiment, the terminal device further includes an antenna system, where the antenna system receives or sends a wireless communication signal under the control of the processor, to implement wireless communication with a mobile communications network; and the mobile communications network includes one or more of the following: a GSM network, a CDMA network, a 3G network, an FDMA network, a TDMA network, a PDC network, a TACS network, an AMPS network, a WCDMA network, a TDSCDMA network, a Wi-Fi network, and an LTE network.

According to a fourth aspect, an embodiment of the present invention provides an image processing method, where the method is applied to a photographing device including a first camera and a second camera; optical axes of the first camera and the second camera are parallel to each other, a spacing between the first camera and the second camera is less than a preset distance, f-numbers of the first camera and the second camera are less than 1.6, and neither of quantities of lenses of the first camera and the second camera is greater than 6. The method includes: obtaining a first image that is of a to-be-photographed object and that is photographed by the first camera; obtaining a second image that is of the to-be-photographed object and that is photographed by the second camera; obtaining a first sub-image of the first image, where definition of the first sub-image satisfies a preset definition standard; obtaining a second sub-image of the second image, where definition of the second sub-image satisfies the preset definition standard, there is an image intersection set between the first sub-image and the second sub-image, and an image union set between the first sub-image and the second sub-image can represent the to-be-photographed object; and performing fusion processing on the first sub-image and the second sub-image, to obtain a target image.

According to a fifth aspect, an embodiment of the present invention provides an image processing apparatus, where the apparatus is applied to a photographing device including a first camera and a second camera; optical axes of the first camera and the second camera are parallel to each other, a spacing between the first camera and the second camera is less than a preset distance, f-numbers of the first camera and the second camera are less than 1.6, and neither of quantities of lenses of the first camera and the second camera is greater than 6. The apparatus includes: a first obtaining module, configured to obtain a first image that is of a to-be-photographed object and that is photographed by the first camera; a second obtaining module, configured to obtain a second image that is of the to-be-photographed object and that is photographed by the second camera; a third obtaining module, configured to obtain a first sub-image of the first image, where definition of the first sub-image satisfies a preset definition standard; a fourth obtaining module, configured to obtain a second sub-image of the second image, where definition of the second sub-image satisfies the preset definition standard, there is an image intersection set between the first sub-image and the second sub-image, and an image union set between the first sub-image and the second sub-image can represent the to-be-photographed object; and an image splicing module, configured to perform fusion processing on the first sub-image and the second sub-image, to obtain a target image.

In one embodiment, the obtaining a first sub-image of the first image includes: obtaining a first physical design parameter of the first camera, where the first physical design parameter indicates that, in any image photographed by the first camera, definition of an image in a first region is higher than definition of an image in a second region and satisfies the preset definition standard, and the second region is a complementary set of the first region in the image photographed by the first camera; obtaining a first region of the first image based on the first physical design parameter; obtaining an image receiving region P of an image sensor in the first camera; and determining, as the first sub-image, an image of a region S1 that is an intersection set between the first region of the first image and P. This technical feature may be implemented by the third obtaining module. In this embodiment of the present invention, the first region and the second region may be any pattern, and this is not limited in this embodiment of the present invention.

More specifically, this technical solution may be implemented by a processor invoking a program and an instruction in a memory or on a cloud side to perform a corresponding operation.

In one embodiment, the obtaining a second sub-image of the second image includes: obtaining a second physical design parameter of the second camera, where the second physical design parameter indicates that, in any image photographed by the second camera, definition of an image in a third region is higher than definition of an image in a fourth region and satisfies the preset definition standard, and the fourth region is a complementary set of the third region in the image photographed by the second camera; obtaining a third region of the second image based on the second physical design parameter; obtaining an image receiving region Q of an image sensor in the second camera; and determining, as the second sub-image, an image of a region S2 that is an intersection set between the third region of the second image and Q. This technical feature may be implemented by the fourth obtaining module. In this embodiment of the present invention, the third region and the fourth region may be any pattern, and this is not limited in this embodiment of the present invention.

More specifically, this technical solution may be implemented by a processor invoking a program and an instruction in a memory or on a cloud side to perform a corresponding operation.

In one embodiment, the first physical design parameter indicates that: an MTF value corresponding to an image photographed by the first camera in a field-of-view range of $[0, \theta_1]$ at a preset spatial frequency is greater than a preset first threshold, where $\theta_1$ is less than ½ of a field of view of the first camera; and an MTF value corresponding to an image photographed by the first camera in another field-of-view range at the preset spatial frequency is not greater than the preset first threshold. This information may be stored in a memory or on a cloud side of a network.

In one embodiment, the second physical design parameter indicates that: an MTF value corresponding to an image photographed by the second camera in a field-of-view range of $[\theta_2, \theta_3]$ at the preset spatial frequency is greater than a preset second threshold, where $\theta_3$ is less than ½ of a field of view of the second camera, and $0<\theta_2<\theta_1<\theta_3$; and an MTF value corresponding to an image photographed by the second camera in another field-of-view range at the preset spatial frequency is not greater than the preset second threshold. This information may be stored in a memory or on a cloud side of a network.

In one embodiment, the performing fusion processing on the first sub-image and the second sub-image, to obtain a target image includes any one of the following three manners and may be implemented by the image splicing module:

manner 1: determining an image of a region S3 that is an intersection set between S1 and S2; determining an image of a region S32 that is a complementary set of S3 in S2; and performing fusion processing on the image of S1 and the image of S32, to obtain the target image; or manner 2: determining an image of a region S3 that is an intersection set between S1 and S2; determining an image of a region S31 that is a complementary set of S3 in S1; and performing fusion processing on the image of S31 and the image of S2, to obtain the target image; or manner 3: determining an image of a region S3 that is an intersection set between S1 and S2; determining an image of a region S31 that is a complementary set of S3 in S1; determining an image of a region S32 that is a complementary set of S3 in S2; performing, by using S1 and S2, enhancement processing on S3 based on a preset enhancement algorithm, to obtain an image of S4; and performing fusion processing on the image of S31, the image of S32, and the image of S4, to obtain the target image.

More specifically, this technical solution may be implemented by a processor invoking a program and an instruction in a memory to perform a corresponding operation.

In one embodiment, the image processing apparatus further includes an adjusting module, configured to adjust the spacing between the first camera and the second camera.

In one embodiment, the photographing device further includes a third camera, where an optical axis of the third camera and an optical axis of the first camera are parallel to each other; a spacing between the third camera and the first camera is less than the preset distance; and a spacing between the third camera and the second camera is less than the preset distance. The method further includes: obtaining a third image that is of the to-be-photographed object and that is photographed by the third camera; obtaining third parameter information of the third camera, where the third camera is obtained by designing according to the third parameter information, the third parameter information indicates that an MTF value corresponding to an image photographed by the third camera in a field-of-view range of $[\theta_4, \theta_5]$ at the preset spatial frequency is greater than a preset third threshold, $\theta_2<\theta_4<\theta_3<\theta_5$, and $\theta_5$ is less than ½ of a field of view of the third camera; obtaining a third sub-image of the third image based on the third parameter information, where definition of the third sub-image is higher than definition of a third complementary-set image, the third complementary-set image is a complementary set of the third sub-image in the third image, there is an image intersection set between the second sub-image and the third sub-image, and an image union set of the first sub-image, the second sub-image, and the third sub-image can represent the to-be-photographed object; and performing fusion processing on the target image and the third sub-image, to obtain a new target image. For the apparatus, the apparatus further includes: a fifth obtaining module, configured to obtain a third image that is of the to-be-photographed object and that is photographed by the third camera; and a sixth obtaining module, configured to obtain third parameter information of the third camera, where the third camera is obtained by designing according to the third parameter information, the third parameter information indicates that an MTF value corresponding to an image photographed by the third camera in a field-of-view range of $[\theta_4, \theta_5]$ at a preset spatial frequency is greater than a preset third threshold, $\theta_2<\theta_4<\theta_3<\theta_5$, and $\theta_5$ is less than ½ of a field of view of the third camera. The sixth obtaining module is further configured to obtain a third sub-image of the third image based on the third parameter information, where definition of the third sub-image is higher than definition of a third complementary-set image, where the third complementary-set image is a complementary set of the third sub-image in the third image, there is an image intersection set between the second sub-image and the third sub-image, and an image union set of the first sub-image, the second sub-image, and the third sub-image can represent the to-be-photographed object; and the image splicing module is further configured to perform fusion processing on the target image and the third sub-image, to obtain a new target image.

For related features of the third camera, the foregoing related features of the first camera and the second camera are also applicable.

In one embodiment, the obtaining a first image that is of a to-be-photographed object and that is photographed by the first camera and the obtaining a second image that is of the to-be-photographed object and that is photographed by the second camera are triggered by a same trigger signal, or are triggered separately by two different trigger signals.

In one embodiment, a quantity of lenses included in an imaging lens of the first camera and a quantity of lenses included in an imaging lens of the second camera are 4, 5, or 6.

With reference to the fourth aspect or the fifth aspect, in a possible design, the f-numbers of the first camera and the second camera are the same.

In one embodiment, the image sensors of the first camera and the second camera are the same. Therefore, correspondingly, the foregoing P and the foregoing Q are also the same.

In one embodiment, the first camera and the second camera have a same focal length and a same (maximum) field of view.

In one embodiment, the preset first threshold and the preset second threshold are greater than or equal to 0.25.

In one embodiment, the preset spatial frequency is greater than 400 line pairs/mm. Generally, for a same image, as the spatial frequency increases, corresponding precision of the image is higher. As the spatial frequency increases, an MTF value can be greater than a preset threshold, indicating that definition of the image is better.

In one embodiment, S1 is a circular region.

In one embodiment, due to an error brought by device manufacturing and an environment in which a camera is located, an image region corresponding to the foregoing field-of-view range such as $[0, \theta_1]$ or $[\theta_2, \theta_3]$ is not necessarily a regular circle or circular ring, but may be an approximate circle or circular ring or may be some irregular patterns, provided that, under the premise of taking a same image sensor as a reference, all high-definition sub-images finally obtained by the camera can cover a region in which the image sensor is located. In this way, seamless splicing can be implemented, to form a high-definition target image that satisfies an extra-large aperture.

In one embodiment, in a process of determining a sub-image, in the foregoing field-of-view range such as $[0, \theta_1]$ or $[\theta_2, \theta_3]$, an image processing program may alternatively take a local part of the foregoing two regions, for example, an image of a square, elliptical, or non-circular region, to perform corresponding splicing, provided that a union set of these sub-images can cover a region in which an image sensor is located, and a high-definition to-be-photographed object can be represented.

It is re-emphasized that patterns of the first region, the second region, the third region, and the fourth region are not limited.

According to a sixth aspect, an embodiment of the present invention provides a terminal device. The terminal device includes a first camera, a second camera, a memory, a processor, and a bus. The first camera, the second camera, the memory, and the processor are connected by using the bus, where optical axes of the first camera and the second camera are parallel to each other, a spacing between the first camera and the second camera is less than a preset distance, f-numbers of the first camera and the second camera are less than 1.6, and neither of quantities of lenses of the first camera and the second camera is greater than 6. The camera is configured to collect an image signal under the control of the processor; the memory is configured to store a computer program and an instruction; and the processor is configured to invoke the computer program and the instruction stored in the memory, to perform the method according to any one of the foregoing possible implementations.

In one embodiment, the terminal device further includes an antenna system, where the antenna system receives or sends a wireless communication signal under the control of the processor, to implement wireless communication with a mobile communications network; and the mobile communications network includes one or more of the following: a GSM network, a CDMA network, a 3G network, an FDMA network, a TDMA network, a PDC network, a TACS network, an AMPS network, a WCDMA network, a TDSCDMA network, a Wi-Fi network, and an LTE network.

In addition, the foregoing method, apparatus, and device may be applied to a scenario in which there are more cameras.

The foregoing method, apparatus, and device may be applied to a scenario in which shooting is performed by using camera software built in a terminal, or may be applied to a scenario in which a terminal runs third-party camera software to perform shooting. The shooting includes a plurality of shooting manners, such as normal shooting, self-shooting, video telephony, video conference, VR shooting, and aerial photography.

According to the technical solutions of the present invention, image shooting with an extra-large aperture and higher definition can be implemented under the premise of not increasing complexity of a production process.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a terminal may be a device that provides photographing and/or data connectivity to a user, or a handheld device having a wireless connection function, or another processing device connected to a wireless modem, for example, a digital camera, a single-lens reflex camera, or a mobile phone (which may also be referred to as a "cellular" phone); or may be a portable, pocket-sized, handheld, or wearable device (for example, a smartwatch), a tablet, a personal computer (PC), a personal digital assistant (PDA), a point of sale (PoS), a vehicle-mounted computer, an unmanned aerial vehicle, and an aerial camera.

Figure 1:
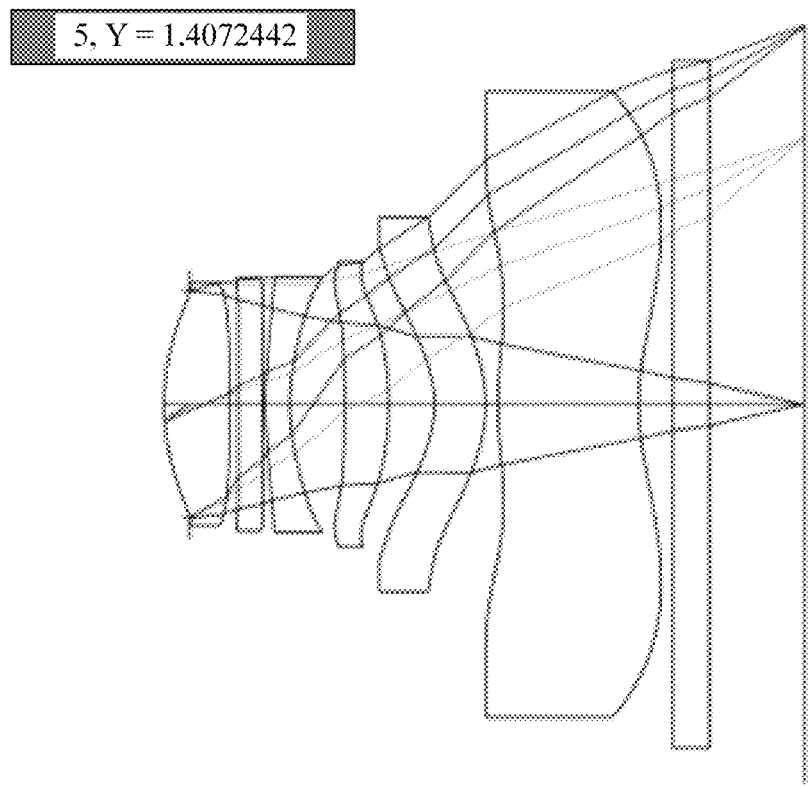
FIG. 1 is a schematic structural diagram of a lens.
Figure 2:
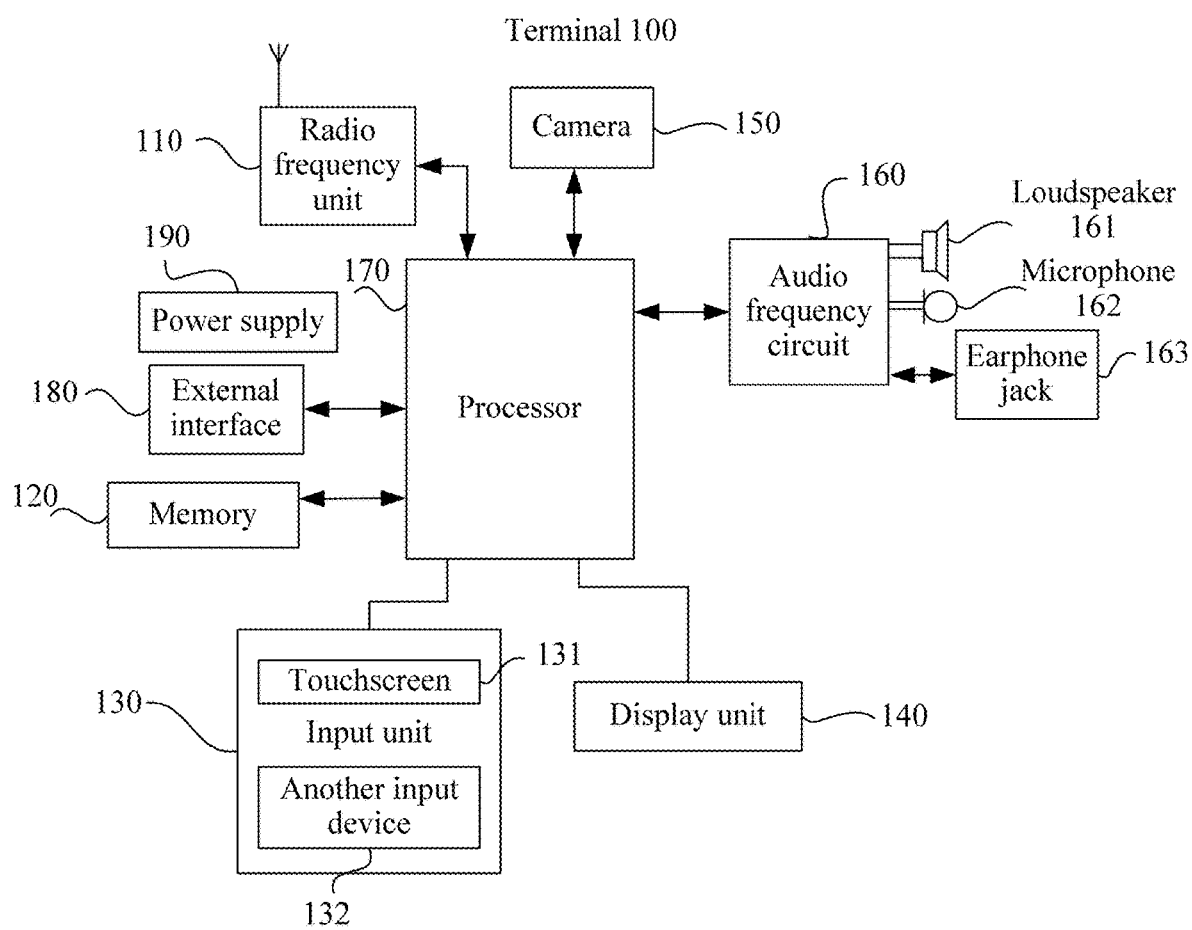
FIG. 2 is a schematic structural diagram of a terminal.

FIG. 2 is a schematic diagram of an optional hardware structure of a terminal 100.

As shown in FIG. 2, the terminal 100 may include components, such as a radio frequency unit 110, a memory 120, an input unit 130, a display unit 140, a camera 150, an audio frequency circuit 160, a loudspeaker 161, a microphone 162, a processor 170, an external interface 180, and a power supply 190. In this embodiment of the present invention, there are at least two cameras 150.

The camera 150 is configured to collect an image or a video, and may be triggered and enabled by using an application instruction, to implement a photographing or shooting function. The camera 150 includes components, such as an imaging lens, a light filter, an image sensor, and a focusing anti jitter motor. A light ray emitted or reflected by an object enters the imaging lens, passes through the light filter, and finally converges on the image sensor. The imaging lens is mainly configured to perform convergence and imaging on light rays emitted or reflected by all objects in a photographing field of view; the light filter is mainly configured to filter out unnecessary light waves (for example, light waves other than visible light such as infrared light) in the light rays; and the image sensor is mainly configured to perform photoelectric conversion on a received optical signal to convert the optical signal into an electrical signal and input the electrical signal to the processor 170 for subsequent processing.

A person skilled in the art may understand that, FIG. 2 is merely an example of a portable multifunctional apparatus, and shall not be construed as any limitation on the portable multifunctional apparatus. The apparatus may include more or fewer components than those shown in the figure, or combine some components or different components.

The input unit 130 may be configured to receive input numeral or character information, and generate a key signal input related to user setting and function control of the portable multifunctional apparatus. Specifically, the input unit 130 may include a touchscreen 131 and another input device 132. The touchscreen 131 can collect a touch operation (such as an operation performed by a user on the touchscreen or near the touchscreen by using a finger, a joint, or any proper object such as a stylus) on or near the touchscreen, and drive a corresponding connection apparatus according to a preset program. The touchscreen can detect a user's touch action on the touchscreen, convert the touch action into a touch signal and send the touch signal to the processor 170, and can receive and execute a command sent by the processor 170, where the touch signal includes at least touch point coordinate information. The touchscreen 131 may provide an input interface and an output interface between the terminal 100 and a user. In addition, the touchscreen may be implemented in a plurality of types, such as a resistor type, a capacitor type, an infrared type, and a surface acoustic wave type. The input unit 130 may further include another input device in addition to the touchscreen 131. Specifically, the another input device 132 may include but is not limited to one or more of the following: a physical keyboard, a function key (for example, a volume control key 132 or a switch key 133), a trackball, a mouse, a joystick, or the like.

The display unit 140 may be configured to display information input by a user or information provided for a user and various menus of the terminal 100. In this embodiment of the present invention, the display unit is further configured to display an image obtained by a device using the camera 150, including a preview image, a shot initial image, and a target image processed by a specific algorithm after shooting.

Further, the touchscreen 131 may cover a display panel 141. When detecting a touch operation on or near the touchscreen, the touchscreen 131 transmits the touch operation to the processor 170 to determine a type of a touch event, and then the processor 170 provides a corresponding visual output on the display panel 141 based on the type of the touch event. In this embodiment, the touchscreen and the display unit may be integrated into one component to implement input, output, and display functions of the terminal 100. For ease of description, a touch display screen represents a function set of the touchscreen and the display unit in this embodiment of the present invention; and in some embodiments, the touchscreen and the display unit may alternatively serve as two independent components.

The memory 120 may be configured to store an instruction and data, and the memory 120 may mainly include an instruction storage area and a data storage area, where the data storage area may store an association relationship between a joint touch gesture and an application function, and the instruction storage area may store an operating system, an application, a software unit such as an instruction required by at least one function, or their subsets or extended sets. The memory 120 may further include a nonvolatile random access memory, and provide the processor 170 with the following: management of hardware, software, and data resources of a computing and processing device, and support for control software and applications. The memory 120 is further configured to store a multi-media file, and store an operating program and application.

As a control center of the terminal 100, the processor 170 connects all parts of the entire mobile phone (terminal) by using various interfaces and lines, and performs various functions and data processing of the terminal 100 by running or executing an instruction stored in the memory 120 and invoking data stored in the memory 120, to perform overall monitoring on the mobile phone (terminal). In one embodiment, the processor 170 may include one or more processing units. Optionally, an application processor and a modem processor may be integrated into the processor 170, where the application processor mainly handles an operating system, a user interface, an application, and the like; and the modem processor mainly handles radio communication. It may be understood that, the modem processor may not be integrated into the processor 170. In some embodiments, the processor and the memory may be implemented on a single chip; or in some embodiments, they may be implemented separately on separate chips. The processor 170 may be further configured to generate a corresponding operation control signal, send the signal to a corresponding component of the computing and processing device, and read and process data in software, especially the data and program in the memory 120, so that each function module of the computing and processing device performs a corresponding function, to control the corresponding component to act as required by an instruction.

The radio frequency unit 110 may be configured to receive or send a signal in an information receiving or sending process or a call process, and in particular, after receiving downlink information from a base station, send the downlink information to the processor 170 for processing; and send uplink-related data to the base station. Generally, the radio frequency unit includes but is not limited to: an antenna, at least one amplifier, a transceiver, a coupler, a low noise amplifier (LNA), a duplexer, or the like. In addition, the radio frequency unit 110 may also communicate with a network device or another device through wireless communication. The wireless communication may use any communications standard or protocol, including but not limited to: a global system for mobile communications (GSM), general packet radio service (GPRS), code division multiple access (CDMA), wideband code division multiple access (WCDMA), long term evolution (LTE), email, short message service (SMS), and the like.

The audio frequency circuit 160, the loudspeaker 161, and the microphone 162 may provide an audio interface between a user and the terminal 100. The audio frequency circuit 160 may transmit, to the loudspeaker 161, an electrical signal converted from received audio data, and the loudspeaker 161 converts the electrical signal into a sound signal for outputting. In addition, the microphone 162 is configured to collect the sound signal and may further convert the collected sound signal into an electrical signal; and the audio frequency circuit 160 converts the electrical signal into audio data after receiving the electrical signal and outputs the audio data to the processor 170 for processing, and then the audio data is sent to, for example, another terminal, after passing through the radio frequency unit 110, or the audio data is output to the memory 120 for further processing. The audio frequency circuit may also include an earphone jack 163 for providing a connection interface between the audio frequency circuit and an earphone.

The terminal 100 further includes the power supply 190 (for example, a battery) that supplies power to each component. Optionally, the power supply may be logically connected to the processor 170 by using a power supply management system, so that functions such as charging management, discharging management, and power consumption management are implemented by using the power supply management system.

The terminal 100 further includes the external interface 180, where the external interface 180 may be a standard Micro USB interface, or may be a multi-pin connector, and may be configured to connect the terminal 100 to another apparatus for communication, or may be configured to connect a charger to charge the terminal 100.

Although not shown in the figure, the terminal 100 may further include a camera flash, a wireless fidelity (Wi-Fi) module, a Bluetooth module, various sensors, and the like. Details are not described herein again.

Figure 3:
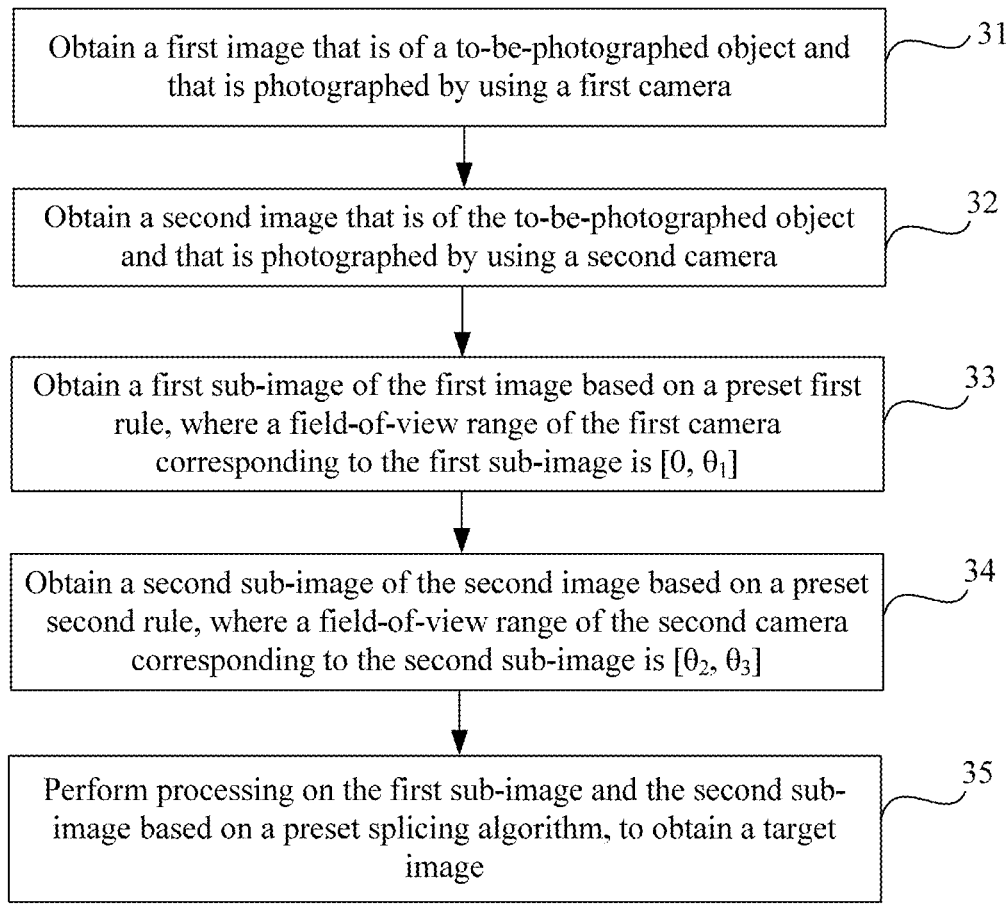
FIG. 3 is a flowchart of an image processing method according to an embodiment of the present invention.
Figure 4:
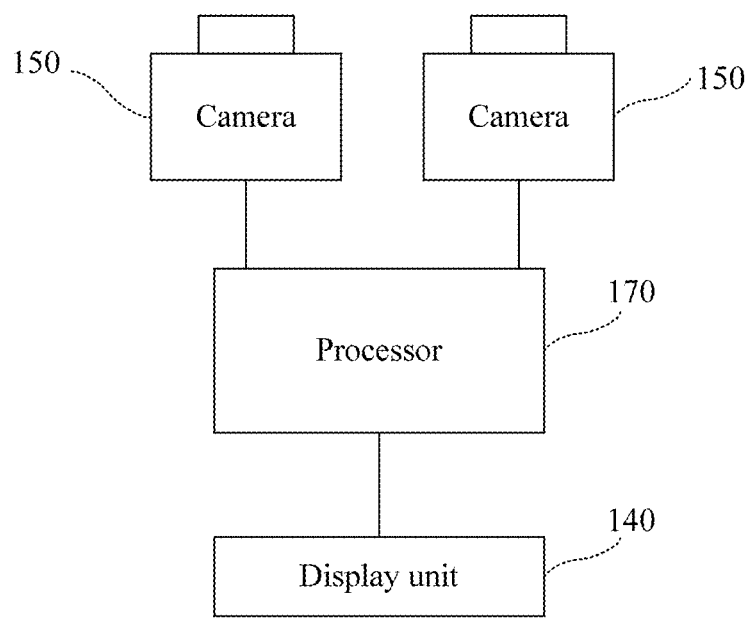
FIG. 4 is a schematic hardware structural diagram of a camera according to an embodiment of the present invention.

As shown in FIG. 3, an embodiment of the present invention provides an image processing method. The method may be applied to a terminal having at least two cameras. For ease of description, the two cameras are referred to as a first camera and a second camera respectively. It should be understood that words such as "first" and "second" in this application are merely used for distinguishing instead of a limitation on an order or performance. Locations of the first camera and the second camera are set in such manner that optical axes of the two cameras are parallel to each other. To implement setting of an extra-large aperture, f-numbers of both cameras are less than 1.6 (the extra-large aperture in this application means that an f-number is less than 1.6); and a minimum limit value of the f-number may be infinitely close to 0. The terminal may be the terminal 100 shown in FIG. 2, or may be a simple camera device, such as a structure shown in FIG. 4. A specific procedure of the processing method includes the following operations.

Operation 31: Obtain a first image that is of a to-be-photographed object and that is photographed by the first camera.

Operation 32: Obtain a second image that is of the to-be-photographed object and that is photographed by the second camera.

The to-be-photographed object may be understood as an object that a user expects to photograph; or may be understood as an imaging object that the terminal displays on a screen when a user adjusts a photographing position of the terminal, for example, a common image portion that is framed by two cameras. It should be understood that, because the first camera and the second camera are not in a same position, during photographing of the to-be-photographed object, image content obtained by the first camera is not completely the same as that obtained by the second camera, but most of image regions are the same, and there is a slight difference between edges. However, a person skilled in the art should understand that, in a dual-camera scenario, when the position of the terminal is fixed, theoretically imaging of the two cameras is considered to be approximately the same. For a difference between images photographed by the two cameras, a person skilled in the art may alternatively use an existing correction technology to correct the images photographed by the two cameras, for example, correction considering a position offset factor, so that the first image and the second image are obtained and approximately the same; or a common image region in the two images may be taken as the first image and the second image, making them approximately the same. For more accurate subsequent processing of the images, a geometric center of the first image and a geometric center of the second image may be corrected to overlap with each other. To be specific, when the two images are compared in terms of content, if the geometric centers are coincident, portions, with same content, of the two images can overlap with each other.

Operation 33: Obtain a first sub-image of the first image based on a preset first rule, where a field-of-view range of the first camera corresponding to the first sub-image is [0, $\theta_r$].

Operation 34: Obtain a second sub-image of the second image based on a preset second rule, where a field-of-view range of the second camera corresponding to the second sub-image is [$\theta_2$, $\theta_3$], $0<\theta_2<\theta_1<\theta_3$, and there is an image overlapping between the first sub-image and the second sub-image.

The field of view may be specified in advance, or may be determined after a camera parameter is obtained.

It should be understood that an image intersection set, namely, an overlapping image, is a region, with same content, of the two images. In a specific implementation process, it is assumed that the first sub-image and the second sub-image are placed in an aligned manner, so that they coincide with each other in a region with same content; and if geometric centers of the first sub-image and the second sub-image coincide with each other, an intersection set between the first sub-image and the second sub-image is a circular ring region, where an outer ring of the circular ring region is completely located within the second sub-image, and an inner ring of the circular ring region is completely located within the first sub-image, so that the first sub-image and the second sub-image can form complete imaging of the to-be-photographed object. In another specific implementation process, it is assumed that the first sub-image and the second sub-image are placed in an aligned manner, so that they coincide with each other in a region with same content; and if geometric centers of the first sub-image and the second sub-image do not coincide with each other, an intersection set between the first sub-image and the second sub-image is not a circular ring, but may be a closed region jointly enclosed by an internal closed curve and an external closed curve, where the external curve of the closed region is completely located within the second sub-image and the internal curve of the closed region is completely located within the first sub-image.

Operation 35: Perform processing on the first sub-image and the second sub-image based on a preset splicing algorithm, to obtain a target image.

In one embodiment, it is assumed that the first sub-image and the second sub-image are placed in an aligned manner, so that they coincide with each other in a region with same content; and if geometric centers of the first sub-image and the second sub-image do not coincide with each other, an intersection set between the first sub-image and the second sub-image is not a circular ring, but may be a non-closed region jointly enclosed by an internal closed curve and an external closed curve; and if image content of the non-closed region does not affect representation of the to-be-photographed object, or if image quality of the image content of the non-closed region corresponding to the first image or the second image also conforms to a specific image quality standard, fusion processing may be performed subsequently on the first sub-image, the second sub-image, and a corresponding image of the non-closed region in the first image or the second image, to obtain a target image.

Operations 31 and 32 are described first.

In one embodiment, imaging lenses of the first camera and the second camera are specially manufactured according to a special requirement in advance, that is, according to a specific physical design parameter. A lens manufacturing system may determine a quantity of lenses according to a user's target parameter requirement or according to an empirical value, and formulate a corresponding specific hardware configuration parameter according to the quantity of lenses, such as a focal length of each lens and a relative location of each lens. Due to difficulty in setting an extra-large aperture, under the premise of not increasing the quantity of lenses, the extra-large aperture cannot implement photographing of a clear image within an entire field-of-view range. Therefore, in a specific design, there is a compromise between an f-number and a size of a region in a field-of-view range of a high-quality image, and as the f-number becomes smaller, the field-of-view range in which an obtained image satisfies a definition requirement becomes smaller.

Figure 5:
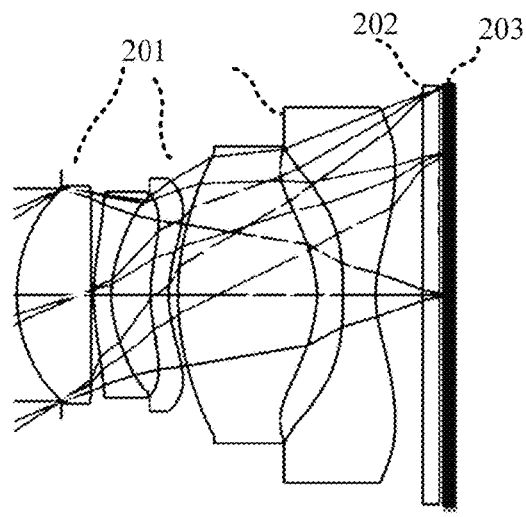
FIG. 5 is a schematic diagram of a first camera according to an embodiment of the present invention.

In one embodiment of the present invention, as shown in FIG. 5, an imaging lens 201 of the first camera includes five lenses, but a quantity of lenses is not limited to five, and there may be four to six lenses. In the present invention, when an imaging lens is designed, a designed f-number is slightly small, for example, $FNO_1$ (where $FNO_1$ is less than 1.6), and an imaging quality design weight of a field-of-view range of [0, $\theta_1$] is added, so that imaging quality of the first camera in the field-of-view range of [0, $\theta_1$] with a large aperture meets expectation. In other words, quality of an imaging range corresponding to the field-of-view range of [0, $\theta_1$] satisfies a requirement of $FNO_1$; and image quality of a field-of-view range beyond $\theta_1$ is not concerned, and it does not matter even if the quality is poor. Under such a parameter constraint, a corresponding imaging lens can be manufactured by using an existing process without much increasing difficulty. It can be learned that a smaller $FNO_1$ that the first camera implements is at the expense of sacrificing image quality corresponding to a field-of-view range other than [0, $\theta_1$].

Therefore, due to the foregoing special design requirement of the imaging lens of the first camera, in a to-be-photographed object obtained by the first camera, image quality corresponding to the field-of-view range of [0, $\theta_1$] can satisfy the requirement of $FNO_1$. Whether $FNO_1$ is satisfied or not may be measured by using an MTF. For example, under a preset spatial frequency threshold, a value of the MTF can still reach a preset standard. $\theta_1$ is not greater than ½ of a field of view of the first camera. It should be understood that a field of view is an inherent property of a camera after the camera is fixed onto a terminal, and is a maximum field of view angle at which the camera is capable of imaging when the terminal is located at a fixed position. It is well known in the industry that an angle formed by two edges of a largest range of a lens through which an image of a to-be-measured object can pass is referred to as a field of view.

Figure 6:
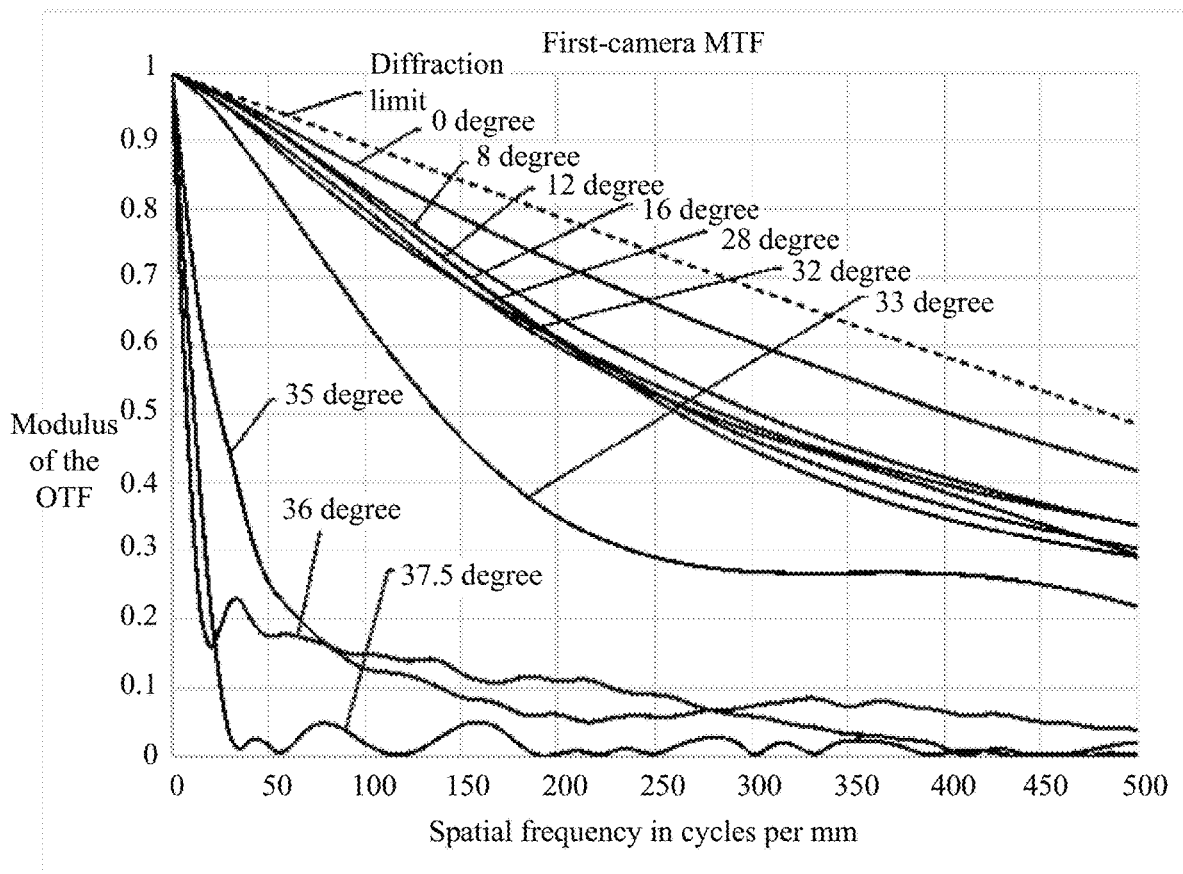
FIG. 6 is a schematic diagram of image quality evaluation of a first camera according to an embodiment of the present invention.

In one embodiment, for an evaluation standard, reference may be made to FIG. 6. In this embodiment, specific parameters of the first camera are as follows: an FNO is 1.4, a focal length is 3.95 mm, and an FOV is 75° and may alternatively be expressed as [0, 37.5°] (Note: In this application, the field-of-view range is 0 and may be expressed as $$\left[0, \tfrac{1}{2}\phi\right],$$

indicating that a lens is a starting point, an optical axis is a center, and a range of an angle of a conical region projected onto a plane is $$\left[-\tfrac{1}{2}\phi, \tfrac{1}{2}\phi\right],$$

where the conical region is formed by all rays at an angle of $$\tfrac{1}{2}\phi$$

to the optical axis). MTF performance is shown in FIG. 6. The figure shows an MTF (where a contrast of an output image that passes through an optical system is always worse than a contrast of an input image, a quantity of changes in contrast is closely related to a spatial frequency characteristic, and a ratio of the contrast of the output image to the contrast of the input image may be defined as an MTF) of an imaging lens in a sagittal direction, and a denoted angle is a corresponding half field of view. Different lines represent different MTF curves of a ½ FOV. A horizontal ordinate represents a spatial frequency. As a value becomes larger, a resolution of an image is higher. A vertical coordinate represents the MTF, indicating a contrast of an image. As the contrast becomes greater, the image becomes clearer. A dashed line in the figure represents a limit of a contrast of a system. Image quality increases as a value is closer to the dashed line. Likewise, MTF representation of the imaging lens in a meridian direction is similar to that in the sagittal direction.

During imaging of the first camera, an MTF value of a center FOV of about [0°, 32°] is relatively high. When a spatial frequency of an image in the FOV range is 500 line pairs/mm, an MTF value of an obtained image can still be maintained at 0.3 or more. Therefore, imaging quality of the region can be considered to reach a very high level when the FNO is 1.4. However, for an image obtained by the first camera in an FOV range of approximately [32°, 37.5°], a corresponding MTF value is relatively poor, and high quality imaging in this field-of-view region is undertaken by the second camera. It should be understood that, due to a manufacturing process factor, a boundary between a high-quality image region and a low-quality image region is not necessarily strictly circular, and an actual boundary may be an irregular pattern.

Figure 7:
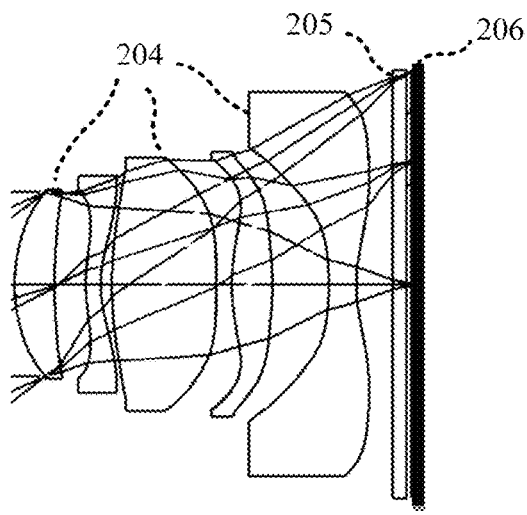
FIG. 7 is a schematic diagram of a second camera according to an embodiment of the present invention.

In one embodiment of the present invention, as shown in FIG. 7, an imaging lens 204 of the second camera includes five lenses, but a quantity of lenses is not limited to five, and there may be four to six lenses. In the present invention, when an imaging lens is designed, a designed f-number is slightly small, for example, $FNO_2$ (where $FNO_2$ is less than 1.6), and an imaging quality design weight of a field-of-view range of $[\theta_2, \theta_3]$ is added, so that imaging quality of the second camera in the field-of-view range of $[\theta_2, \theta_3]$ with a large aperture meets expectation. In other words, quality of an imaging range corresponding to the field-of-view range of $[\theta_2, \theta_3]$ satisfies a requirement of $FNO_2$, and image quality of a field-of-view range less than $\theta_2$ is not concerned, and it does not matter even if the quality is poor. Under such a parameter constraint, a corresponding imaging lens can be manufactured by using an existing process without much increasing difficulty. It can be learned that a smaller $FNO_2$ that the second camera implements is at the expense of sacrificing image quality corresponding to the field-of-view range of $[0, \theta_2]$.

Therefore, due to the foregoing special design requirement of the imaging lens of the second camera, in a to-be-photographed object obtained by the second camera, image quality corresponding to the field-of-view range of $[\theta_2, \theta_3]$ can satisfy the requirement of $FNO_2$. Whether $FNO_2$ is satisfied or not may be measured by using an MTF. For example, under a preset spatial frequency threshold, a value of the MTF can still reach a preset standard. $\theta_3$ is not greater than ½ of a field of view of the second camera.

Figure 8:
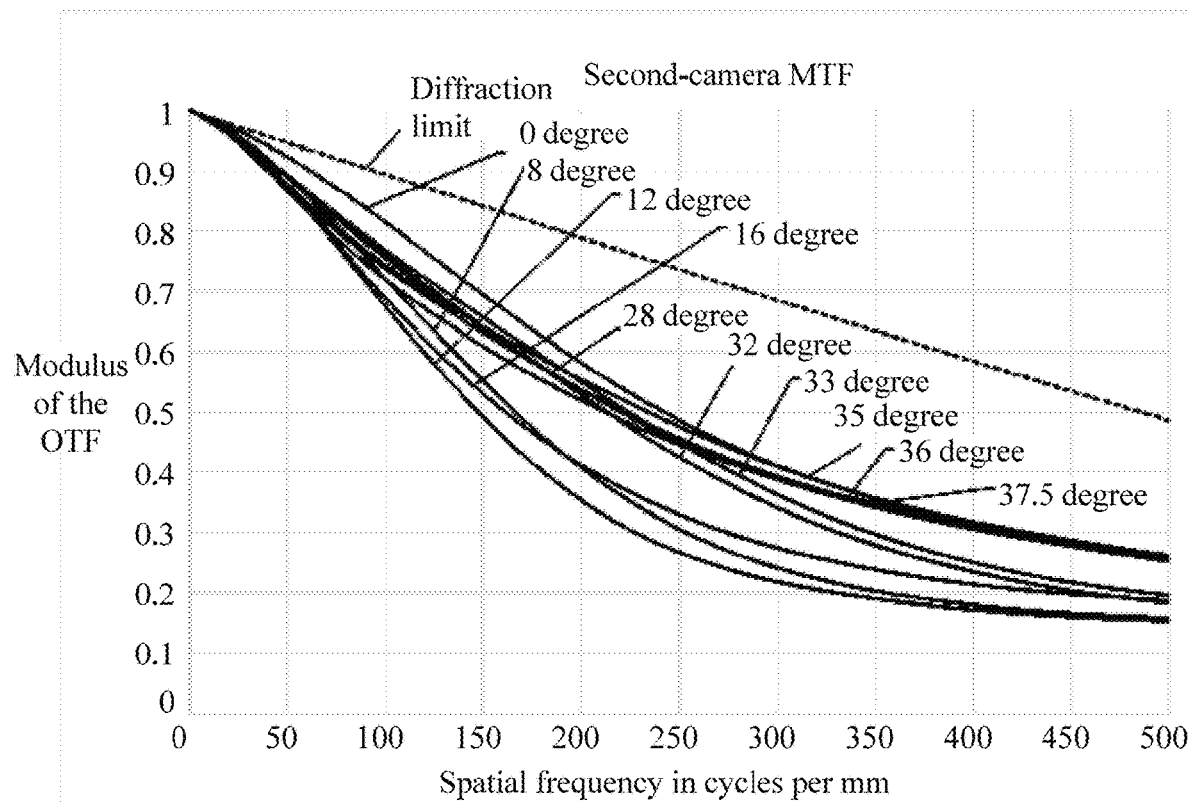
FIG. 8 is a schematic diagram of image quality evaluation of a second camera according to an embodiment of the present invention.

In one embodiment, for an evaluation standard, reference may be made to FIG. 8. In this embodiment, specific parameters of the second camera are as follows: an FNO is 1.4, a focal length is 3.95 mm, and an FOV is 75° and may alternatively be expressed as [0, 37.5°]. MTF performance is shown in FIG. 8. The figure shows an MTF (where a contrast of an output image that passes through an optical system is always worse than a contrast of an input image, a quantity of changes in contrast is closely related to a spatial frequency characteristic, and a ratio of the contrast of the output image to the contrast of the input image may be defined as an MTF) of an imaging lens in a sagittal (Sagittal) direction, and a denoted angle is a corresponding half field of view. Different lines represent different MTF curves of a ½ FOV. A horizontal ordinate represents a spatial frequency. As a value becomes larger, a resolution of an image is higher. A vertical coordinate represents the MTF, indicating a contrast of an image. As the contrast becomes greater, the image becomes clearer. A dashed line in the figure represents a limit of a contrast of a system. Image quality increases as a value is closer to the dashed line. Likewise, MTF representation of the imaging lens in a meridian direction is similar to that in the sagittal direction.

During imaging of the second camera, an MTF value of an image in an FOV range of [28°, 37.5°] (Note: In this application, a lens is a starting point, an optical axis is a center, a conical region C1 is formed by all rays at an angle of Ø1 to the optical axis, and a conical region C2 is formed by all rays at an angle of Ø2 to the optical axis; and then a field of view region indicated by [Ø1, Ø2] is a region between C1 and C2) is relatively high, when a spatial frequency of the image in the FOV range is 500 line pairs/mm, an MTF value can still be maintained at 0.25 or more. Therefore, imaging quality of the region can be considered to reach a very high level when the FNO is 1.4. However, a corresponding MTF value of an image obtained by the second camera in an FOV range of about [0°, 28°] is relatively poor.

Parameter information of a lens is stored locally in advance in a photographing device or a cloud server; therefore, in a process of performing subsequent image processing, a processor may perform truncation processing on an image obtained by a camera based on local parameter information to obtain a partial region in which definition of an extra-large aperture is satisfied, to perform subsequent splicing and fusion processing (In the present invention, splicing and fusion are both used to implement image splicing, except that their names are different, and each is an existing technology that processes a plurality of partial images into a complete image).

Figure 9:
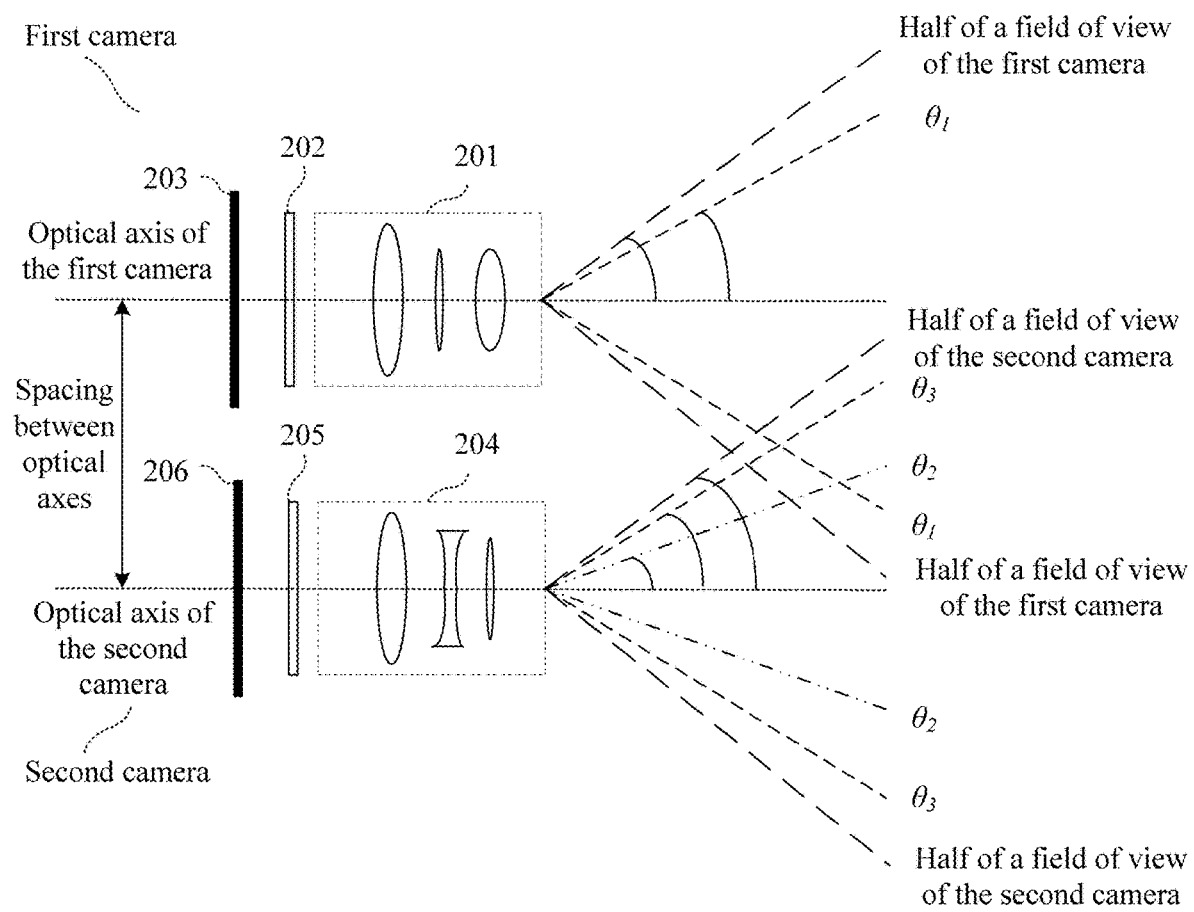
FIG. 9 is a principle diagram of obtaining an image by a dual-lens module according to an embodiment of the present invention.

In a specific implementation process, as shown in FIG. 9, the first camera includes an imaging lens 201, a light filter 202, and an image sensor 203; and the second camera includes an imaging lens 204, a light filter 205, and an image sensor 206. Optical axes of the first camera and the second camera are parallel to each other, and a spacing between the optical axes is a preset distance. Due to a special design of the first camera and the second camera, the first camera is capable of obtaining an image with good definition in a field-of-view range of $[0, \theta_r]$; and the second camera is capable of obtaining an image with good definition in a field-of-view range of $[\theta_2, \theta_3]$.

If projected onto a plane in which the image sensor is located, an image that can be obtained by the imaging lens should theoretically be a circular region, and a size of the circular region depends on an entire field of view of the imaging lens. However, the image sensor is generally designed to be a square; therefore, images finally obtained by the first camera and the second camera respectively, that is, images finally received by the image sensors, are square. It should be understood that, if a difference between the images obtained by the two sensors is within a tolerance range of a subsequent processing algorithm, the images may be directly used as the first image and the second image; or if a difference between the images obtained by the two sensors exceeds a tolerance range of a subsequent processing algorithm, the first image and the second image need to be obtained by using a correction technology in the prior art or by truncating a region with a same content. Therefore, how to perform subsequent processing based on the square images obtained by the two cameras is particularly important. To be specific, steps 33, 34, and 35 are particularly important.

Operation 33: Obtain first parameter information of the first camera, where the first parameter information includes: a manufacturing parameter, a performance parameter, and the like of the first camera, for example, a specific field-of-view range in which an image meeting a definition requirement can be obtained by the first camera with a larger aperture. For example, it can be specifically learned that, a modulation transfer function (MTF) value corresponding to an image that is photographed by the first camera in a field-of-view range of $[0, \theta_1]$ at a preset spatial frequency is greater than a preset first threshold, where $\theta_1$ is less than ½ of a field of view of the first camera.

Then an image receiving region P of an image sensor in the first camera is obtained, that is, an image received by the image sensor in the first camera may be obtained; and an image of a region S1 that is an intersection set between a region of the first image in the field-of-view range of $[0, \theta_1]$ and P is determined as the first sub-image based on the parameter information and the image receiving region P of the sensor.

Figure 10:
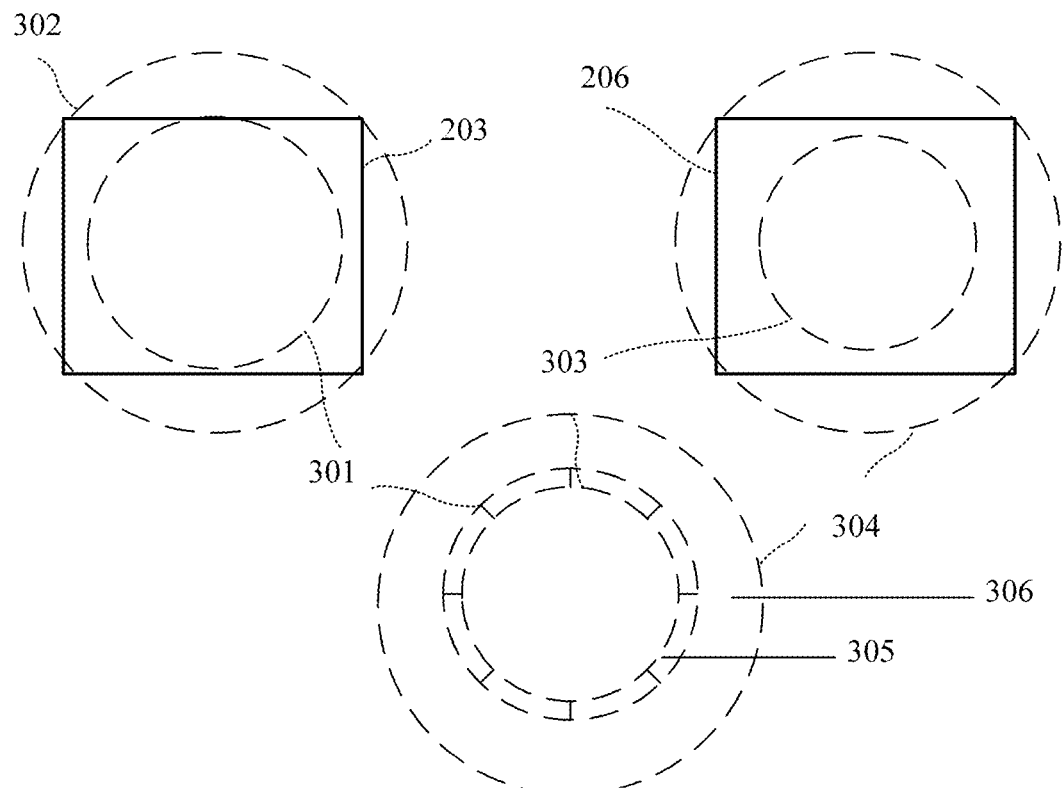
FIG. 10 is another principle diagram of obtaining an image according to an embodiment of the present invention.

Specifically, in an embodiment as shown in FIG. 10, a region in which a square 203 is located represents the image receiving region of the image sensor in the first camera; and different circles represent different field-of-view ranges. For example, a region in which a circle 301 is located corresponds to an image region in a field-of-view range of $[0, \theta_1]$; and a region in which a circle 302 is located corresponds to an image region in an entire field of view of the first camera. Therefore, in this example, a region that is an intersection set between 301 and 203 is the first sub-image. In a specific design process of the first camera, geometric centers of 301 and 203 are the same, and a diameter of 301 is less than a diameter of a circumscribed circle of the square 203. Due to a special design of the first camera and the foregoing method for obtaining the first sub-image, definition of the obtained first sub-image satisfies an extra-large aperture of $FNO_1$.

Operation 34: Obtain second parameter information of the second camera, where the second parameter information includes: a manufacturing parameter, a performance parameter, and the like of the second camera, for example, a specific field-of-view range in which an image meeting a definition requirement can be obtained by the second camera with a larger aperture. For example, it can be specifically learned that, an MTF value corresponding to an image that is photographed by the second camera in a field-of-view range of $[\theta_2, \theta_3]$ at a preset spatial frequency is greater than a preset second threshold, where $0<\theta_2<\theta_1<\theta_3$, and $\theta_3$ is less than or equal to ½ of a field of view of the second camera.

Then an image receiving region Q of an image sensor in the second camera is obtained, that is, an image received by the image sensor in the second camera may be obtained; and an image of a region S2 that is an intersection set between a region of the second image in the field-of-view range of $[\theta_2, \theta_3]$ and Q is determined as the second sub-image based on the parameter information and the image receiving region Q of the sensor.

Specifically, in an embodiment as shown in FIG. 10, a region of a square 206 represents the image receiving region of the image sensor in the second camera; and different circles represent different field-of-view ranges. For example, a region in which a circle 303 is located corresponds to an image region in a field-of-view range of $[0, \theta_2]$, a region in which a circle 304 is located corresponds to an image region in a field-of-view range of $[0, \theta_3]$, and a region in which a circular ring 306 sandwiched between the circle 303 and the circle 304 is located corresponds to an image region in a field-of-view range of $[\theta_2, \theta_3]$. Therefore, in this example, a region that is an intersection set between the circular ring 306 and the square 206 is the second sub-image. In a specific design process of the second camera, geometric centers of the circle 303, the circle 304, and the square 206 are the same, a diameter of the circle 303 is less than a diameter of a circumscribed circle of the square 206 and also less than a diameter of the circle 301, and a diameter of the circle 304 is greater than the diameter of the circle 301, to implement seamless image splicing. Generally, the diameter of the circle 304 may be further greater than the diameter of the circumscribed circle of the square 206, to ensure that a complete image can be formed subsequently. Due to a special design of the second camera and the foregoing method for obtaining the second sub-image, definition of the obtained second sub-image satisfies an extra-large aperture of $FNO_2$.

In this way, if the obtained first sub-image and the obtained second sub-image are concentrically placed, an overlapping region of a circular ring 305 in FIG. 10 is formed, and a region in which the circle 301 is located and a region in which the circular ring 306 is located just have a condition for splicing into a complete image. An overlapping portion is a region in which the circular ring 305 is located.

Therefore, it is assumed that the first sub-image is S1, and the second sub-image is S2; and then specific implementation of step 35 may include the following forms:

determine an image of a region S3 that is an intersection set between S1 and S2;

determine an image of a region S32 that is a complementary set of S3 in S2; and perform processing on the image of S1 and the image of S32 based on a preset first splicing algorithm, to obtain the target image;

or, determine an image of a region S3 that is an intersection set between S1 and S2;

determine an image of a region S31 that is a complementary set of S3 in S1; and perform processing on the image of S31 and the image of S2 based on a preset second splicing algorithm, to obtain the target image;

or, determine an image of a region S3 that is an intersection set between S1 and S2;

determine an image of a region S31 that is a complementary set of S3 in S1;

determine an image of a region S32 that is a complementary set of S3 in S2;

perform, by using the image of S1 and the image of S2, enhancement processing on the image of S3 based on a preset enhancement algorithm, to obtain an image of S4; and perform processing on the image of S31, the image of S32, and the image of S4 based on a preset third splicing algorithm, to obtain the target image.

In sum, it can be learned that image quality of a region inside the circle 301 can ensure high definition under an extra-large aperture; and image quality of the region in which the circular ring 306 is located can ensure high definition under an extra-large aperture. Therefore, image quality of a target image formed by splicing them can also ensure high definition under an extra-large aperture.

It should be understood that, to achieve such a purpose that images obtained by the first camera and the second camera can complement each other, major parameters of the second camera should be approximate to major parameters of the first camera. The major parameters include but are not limited to: an f-number, an overall range of a camera's field of view, a quantity of lenses, an imaging focal length, an overall size of an imaging lens, and performance and a size of a sensor. It should be understood that, it is difficult to obtain a completely same result, regardless of any manufacturing method to be used, and some errors in actual parameters are allowed provided that an error range is not large enough to change the essence of technical implementation, and all should fall within the protection scope of the present invention.

In one embodiment, the obtaining a first image that is of a to-be-photographed object and that is photographed by the first camera and the obtaining a second image that is of the to-be-photographed object and that is photographed by the second camera may be triggered by a same trigger signal, or may be triggered separately by two different trigger signals.

In one embodiment, to ensure that pictures taken by the first camera and the second camera can be fused better, a spacing between the first camera and the second camera is less than a preset distance, to ensure that shot pictures are the same as much as possible when the two cameras shoot a same object. It should be understood that, in a dual-camera scenario, setting of the spacing between the two cameras is related to an image region that needs to be obtained, and the image region is determined by a subsequent image region processing algorithm. In the present invention, images obtained by the two cameras are to be subsequently spliced, and therefore it is better if an overlapping region of the images obtained by the two cameras is larger. Optionally, the spacing between the two cameras is less than 1.5 cm, or may be less than or equal to 1 cm in some designs.

In one embodiment, a distance from the first camera and the second camera to the to-be-photographed object also has an influence on a field of view for obtaining a picture. For example, when a camera is closer to the to-be-photographed object, a deviation of the field of view is smaller; or when the camera is farther from the to-be-photographed object, a deviation of the field of view is greater.

In one embodiment, the photographing device may further include an adjustment apparatus, to adjust the spacing between the first camera and the second camera. The spacing between the two cameras may be flexibly adjusted according to a distance of the to-be-photographed object, to ensure that an approximately same image is obtained for the to-be-photographed-object at different distances (for example, a content similarity is greater than 90%, or a ratio of a picture of same content of two images to a picture of a single image is greater than 90%), and to ensure that there is an overlapping region between the first sub-image of the first camera and the second sub-image of the second camera.

In one embodiment, sometimes two cameras cannot obtain a clear image of an extra-large aperture in an entire field of view. In the foregoing embodiment, if the diameter of the circle 304 is not greater than the diameter of the circumscribed circle of the square 206, images that do not satisfy definition of an extra-large aperture in some partial regions may be missed. In this case, the photographing device may further include a third camera, where an optical axis of the third camera and an optical axis of the first camera are parallel to each other; a spacing between the third camera and the first camera is less than the preset distance; and a spacing between the third camera and the second camera is less than the preset distance. The method further includes: obtaining a third image that is of the to-be-photographed object and that is photographed by the third camera; obtaining a third sub-image of the third image based on a preset third rule, where a field-of-view range of the third camera corresponding to the third sub-image is $[\theta_4, \theta_5]$, $\theta_2 < \theta_4 < \theta_3 < \theta_5$, there is an image overlapping between the second sub-image and the third sub-image, and $\theta_5$ is smaller than $\frac{1}{2}$ of a field of view of the third camera; and performing processing on the first sub-image, the second sub-image, and the third sub-image based on a preset fourth splicing algorithm, to obtain the target image.

More cameras may be needed as a lower aperture is implemented, and an image processing method is similar. Application of more lenses is not listed one by one in the present invention.

Due to a special design of the foregoing cameras, the obtained first sub-image and the obtained second sub-image have a splicing condition on their own, and the preset first splicing algorithm, the preset second splicing algorithm, the preset third splicing algorithm, and the preset fourth splicing algorithm in the foregoing embodiments may all be implemented by using the prior art. Details are not described in this specification.

An embodiment of the present invention provides an image processing method, where the method is applied to a photographing device including a first camera and a second camera. Optical axes of the first camera and the second camera are parallel to each other, a spacing between the first camera and the second camera is less than a preset distance, and their f-numbers are both less than 1.6. The method includes: obtaining a first image that is of a to-be-photographed object and that is photographed by the first camera; obtaining a second image that is of the to-be-photographed object and that is photographed by the second camera; obtaining a first sub-image of the first image based on a preset first rule, where a field-of-view range of the first camera corresponding to the first sub-image is [0, $\theta_1$], and obtaining a second sub-image of the second image based on a preset second rule, where a field-of-view range of the second camera corresponding to the second sub-image is [$\theta_2$, $\theta_3$], $\theta_2<\theta_1$, and there is an image overlapping between the first sub-image and the second sub-image; and performing processing on the first sub-image and the second sub-image based on a preset splicing algorithm, to obtain a target image. According to the method, a high-definition image that satisfies an extra-large aperture may be obtained by using an existing process, to simplify a physical design and a manufacturing process of a camera, thereby reducing design and manufacturing costs.

Figure 11:
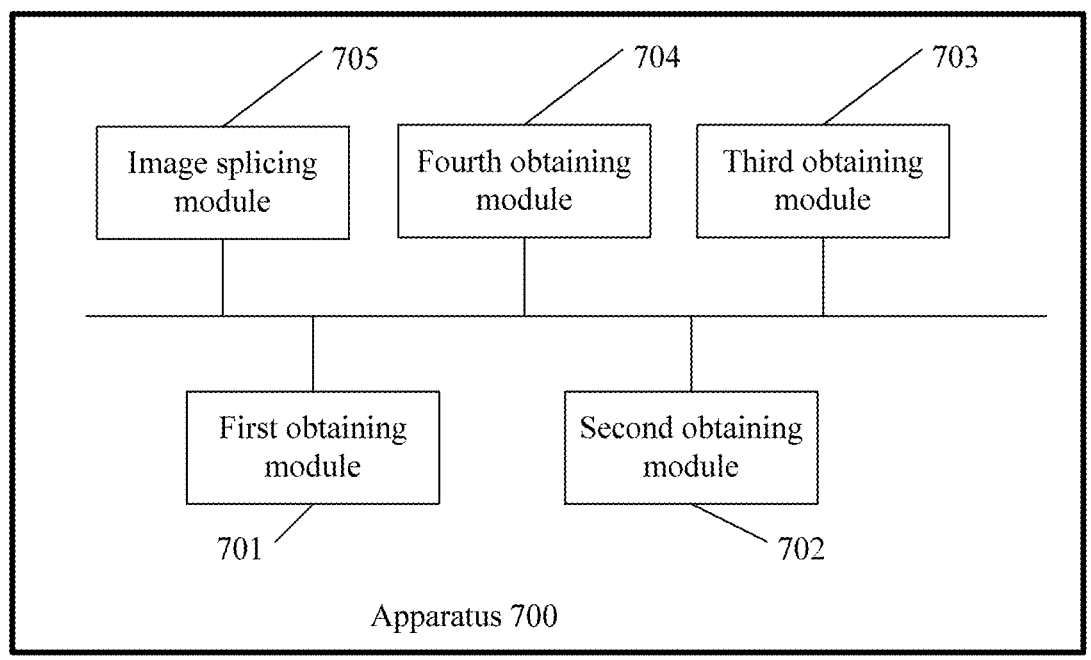
FIG. 11 is a schematic structural diagram of an image processing apparatus according to an embodiment of the present invention.

Based on the image processing method provided in the foregoing embodiment, an embodiment of the present invention provides an image processing apparatus 700. The apparatus 700 is applied to a photographing device including a first camera and a second camera. Optical axes of the first camera and the second camera are parallel to each other, a spacing between the first camera and the second camera is less than a preset distance, and f-numbers of the first camera and the second camera are less than 1.6. As shown in FIG. 11, the apparatus 700 includes a first obtaining module 701, a second obtaining module 702, a third obtaining module 703, a fourth obtaining module 704, and an image splicing module 705.

The first obtaining module 701 is configured to obtain a first image that is of a to-be-photographed object and that is photographed by the first camera. The first obtaining module 701 may be implemented by a processor invoking the first camera to obtain an image.

The second obtaining module 702 is configured to obtain a second image that is of the to-be-photographed object and that is photographed by the second camera. The second obtaining module 702 may be implemented by a processor invoking the second camera to obtain an image.

The third obtaining module 703 is configured to obtain a first sub-image of the first image based on a preset first rule, where a field-of-view range of the first camera corresponding to the first sub-image is [0, $\theta_1$]. The third obtaining module 703 may be implemented by a processor invoking data and an algorithm in a local memory or a cloud server to perform corresponding calculation, to obtain the first sub-image from the first image.

The fourth obtaining module 704 is configured to obtain a second sub-image of the second image based on a preset second rule, where a field-of-view range of the second camera corresponding to the second sub-image is [$\theta_2$, $\theta_3$], and $\theta_2<\theta_1$. The fourth obtaining module 704 may be implemented by a processor invoking data and an algorithm in a local memory or a cloud server to perform corresponding calculation, to obtain the second sub-image from the second image.

The image splicing module 705 is configured to perform processing on the first sub-image and the second sub-image based on a preset splicing algorithm, to obtain a target image. The image splicing module 705 may be implemented by a processor invoking data and a splicing and fusion algorithm in a local memory or a cloud server to perform corresponding calculation, to splice the first sub-image and the second sub-image into a complete target image, where the target image still has high definition under an extra-large aperture.

In one embodiment, the first obtaining module 701 is specifically configured to perform a method in step 31 and an equivalent alternative method; the second obtaining module 702 is specifically configured to perform a method in step 32 and an equivalent alternative method; the third obtaining module 703 is specifically configured to perform a method in step 33 and an equivalent alternative method; the fourth obtaining module 704 is specifically configured to perform a method in step 34 and an equivalent alternative method; and the image splicing module 705 is specifically configured to perform a method in step 35 and an equivalent alternative method. The foregoing specific method embodiments and explanations and expressions in the embodiments are also applicable to method execution in the apparatus.

In addition, in one embodiment, the photographing device may further include a third camera, where an optical axis of the third camera and an optical axis of the first camera are parallel to each other; a spacing between the third camera and the first camera is less than the preset distance; and a spacing between the third camera and the second camera is less than the preset distance. The apparatus further includes: a fifth obtaining module 706 (not shown in the figure), configured to obtain a third image that is of the to-be-photographed object and that is photographed by the third camera; and a sixth obtaining module 707 (not shown in the figure), configured to obtain a third sub-image of the third image based on a preset third rule, where a field-of-view range of the third camera corresponding to the third sub-image is [$\theta_4$, $\theta_5$], $\theta_2<\theta_4<\theta_3<\theta_5$, there is an image overlapping between the second sub-image and the third sub-image, and $\theta_5$ is smaller than ½ of a field of view of the third camera. The image splicing module 705 is specifically configured to perform processing on the first sub-image, the second sub-image, and the third sub-image based on a preset fourth splicing algorithm, to obtain the target image.

An embodiment of the present invention provides an image processing apparatus, where the apparatus is applied to a photographing device including a first camera and a second camera. Optical axes of the first camera and the second camera are parallel to each other, a spacing between the first camera and the second camera is less than a preset distance, and their f-numbers are both less than 1.6. The apparatus obtains a first image that is of a to-be-photographed object and that is photographed by the first camera; obtains a second image that is of the to-be-photographed object and that is photographed by the second camera; obtains a first sub-image of the first image based on a preset first rule, where a field-of-view range of the first camera corresponding to the first sub-image is [0, $\theta_1$], and obtains a second sub-image of the second image based on a preset second rule, where a field-of-view range of the second camera corresponding to the second sub-image is [$\theta_2$, $\theta_3$], $\theta_2<\theta_1$, and there is an image overlapping between the first sub-image and the second sub-image; and performs processing on the first sub-image and the second sub-image based on a preset splicing algorithm, to obtain a target image. According to the apparatus, a high-definition image that satisfies an extra-large aperture may be obtained by using an existing process, to simplify a physical design and a manufacturing process of a camera, thereby reducing design and manufacturing costs.

It should be understood that, division of the modules of the apparatus 700 is merely logical function division, and in actual implementation, some or all of the modules may be integrated into a physical entity, or may be physically separate. For example, each of the foregoing modules may be a separate processing element, or may be integrated into a chip of a terminal during implementation, or may be stored in a form of program code in a storage element of a controller, and invoked by a processing element of a processor to perform functions of the foregoing modules. In addition, the modules may be integrated or may be independently implemented. The processing element herein may be an integrated circuit chip having a signal processing capability. In an implementation process, the steps of the foregoing method or the foregoing modules may be completed by a hardware integrated logic circuit in the processing element or an instruction in a software form. For example, the processing element may be a general purpose processor such as a central processing unit (English: central processing unit, CPU for short), or may be one or more integrated circuits configured to implement the foregoing method, for example, one or more application-specific integrated circuits (English: application-specific integrated circuit, ASIC for short), or one or more digital signal processors (English: digital signal processor, DSP for short), or one or more field programmable gate arrays (English: field-programmable gate array, FPGA for short).

A person skilled in the art should understand that the embodiments of the present invention may be provided as a method, a system, or a computer program product. Therefore, the present invention may use a form of hardware only embodiments, software only embodiments, or embodiments with a combination of software and hardware. Furthermore, the present invention may use a form of a computer program product that is implemented on one or more computer-usable storage media (including but not limited to a magnetic disk memory, a CD-ROM, an optical memory, and the like) that include computer-usable program code.

Embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a special purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, a person skilled in the art may make changes and modifications to these embodiments once they learn the basic inventive concept. Therefore, it is intended to construe the following claims as to cover the embodiments and all changes and modifications falling within the scope of the present invention. Obviously, a person skilled in the art may make various modifications and variations to the embodiments of the present invention without departing from the spirit and scope of the embodiments of the present invention. The present invention is intended to cover these modifications and variations provided that they fall within the scope defined by the following claims and their equivalent technologies.

What is claimed is:

1. An image processing method, comprising:
obtaining, by one or more processors of an image processing apparatus, a first image of an object photographed by a first camera of a photographing device having the first camera and a second camera, wherein optical axes of the first camera and the second camera are parallel to each other, and a spacing between the first camera and the second camera is less than a preset distance, wherein f-numbers of the first camera and the second camera are less than 1.6, and neither of quantities of lenses of the first camera or the second camera is greater than 6;
obtaining, by the one or more processors, a second image of the object photographed by the second camera;
obtaining, by the one or more processors, a first sub-image of the first image, wherein definition of the first sub-image satisfies a preset definition standard;
obtaining, by the one or more processors, a second sub-image of the second image, wherein definition of the second sub-image satisfies the preset definition standard, there is an image intersection set between the first sub-image and the second sub-image, and an image union set between the first sub-image and the second sub-image can represent the object; and
performing, by the one or more processors, fusion processing on the first sub-image and the second sub-image to obtain a target image.

2. The method according to claim 1, wherein the obtaining a first sub-image of the first image comprises:
obtaining a first physical design parameter of the first camera, wherein the first physical design parameter indicates that, in any image photographed by the first camera, definition of an image in a first region is higher than definition of the image in a second region and satisfies the preset definition standard, and the second region is a complementary set of the first region in the image photographed by the first camera;
obtaining a first region of the first image based on the first physical design parameter;
obtaining an image receiving region P of an image sensor in the first camera; and
determining, as the first sub-image, an image of a region S1 that is an intersection set between the first region of the first image and P.

3. The method according to claim 1, wherein the obtaining a second sub-image of the second image comprises:
obtaining a second physical design parameter of the second camera, wherein the second physical design parameter indicates that, in any image photographed by the second camera, definition of an image in a third region is higher than definition of the image in a fourth region and satisfies the preset definition standard, and the fourth region is a complementary set of the third region in the image photographed by the second camera;
obtaining a third region of the second image based on the second physical design parameter;
obtaining an image receiving region Q of an image sensor in the second camera; and
determining, as the second sub-image, an image of a region S2 that is an intersection set between the third region of the second image and Q.

4. The method according to claim 2, wherein the first physical design parameter indicates that:
a modulation transfer function (MTF) value corresponding to an image photographed by the first camera in a field-of-view range of [0, $\theta_1$] at a preset spatial frequency is greater than a preset first threshold; and an MTF value corresponding to an image photographed by the first camera in another field-of-view range at the preset spatial frequency is not greater than the preset first threshold, wherein $\theta_1$ is less than ½ of a field of view of the first camera.

5. The method according to claim 3, wherein the second physical design parameter indicates that:
an MTF value corresponding to an image photographed by the second camera in a field-of-view range of [$\theta_2$, $\theta_3$] at the preset spatial frequency is greater than a preset second threshold; and an MTF value corresponding to an image photographed by the second camera in another field-of-view range at the preset spatial frequency is not greater than the preset second threshold, wherein $\theta_3$ is less than ½ of a field of view of the second camera, and $0<\theta_2<\theta_1<\theta_3$.

6. The method according to claim 1, wherein the performing fusion processing on the first sub-image and the second sub-image to obtain a target image comprises:
determining an image of a region S3 that is an intersection set between an image of a region S1 and an image of a region S2;
determining an image of a region S32 that is a complementary set of S3 in S2; and
performing fusion processing on the image of S1 and the image of S32 to obtain the target image.

7. The method according to claim 1, wherein the performing fusion processing on the first sub-image and the second sub-image, to obtain a target image comprises:
determining an image of a region S3 that is an intersection set between an image of region S1 and an image of region S2;
determining an image of a region S31 that is a complementary set of S3 in S1; and
performing fusion processing on the image of S31 and the image of S2 to obtain the target image.

8. The method according to claim 1, wherein the performing fusion processing on the first sub-image and the second sub-image, to obtain a target image comprises:
determining an image of a region S3 that is an intersection set between an image of region S1 and an image of region S2;
determining an image of a region S31 that is a complementary set of S3 in S1;
determining an image of a region S32 that is a complementary set of S3 in S2;
performing, based on S1 and S2, enhancement processing on S3 to obtain an image of S4; and
performing fusion processing on the image of S31, the image of S32, and the image of S4, to obtain the target image.

9. The method according to claim 1, wherein the first camera and the second camera have a same f-number, or a same focal length, or a same field of view.

10. The method according to claim 1, further comprising:
controlling an adjustment apparatus of the photographing device to adjust the spacing between the first camera and the second camera.

11. An image processing apparatus, comprising:
one or more processors configured to: obtain a first image an object photographed by a first camera of a photographing device having the first camera and a second camera, wherein optical axes of the first camera and the second camera are parallel to each other, and a spacing between the first camera and the second camera is less than a preset distance, wherein f-numbers of the first camera and the second camera are less than 1.6, and neither of quantities of lenses of the first camera or the second camera is greater than 6;
obtain a second image of the object photographed by the second camera;
obtain a first sub-image of the first image, wherein definition of the first sub-image satisfies a preset definition standard;
obtain a second sub-image of the second image, wherein definition of the second sub-image satisfies the preset definition standard, wherein there is an image intersection set between the first sub-image and the second sub-image, and an image union set between the first sub-image and the second sub-image can represent the object; and
perform fusion processing on the first sub-image and the second sub-image to obtain a target image.

12. The apparatus according to claim 11, wherein the one or more processors is further configured to:
obtain a first physical design parameter of the first camera, wherein the first physical design parameter indicates that, in any image photographed by the first camera, definition of an image in a first region is higher than definition of the image in a second region and satisfies the preset definition standard, and the second region is a complementary set of the first region in the image photographed by the first camera;
obtain a first region of the first image based on the first physical design parameter;
obtain an image receiving region P of an image sensor in the first camera; and
determine, as the first sub-image, an image of a region S1 that is an intersection set between the first region of the first image and P.

13. The apparatus according to claim 12, wherein the one or more processors is further configured to:
obtain a second physical design parameter of the second camera, wherein the second physical design parameter indicates that, in any image photographed by the second camera, definition of an image in a third region is higher than definition of the image in a fourth region and satisfies the preset definition standard, and the fourth region is a complementary set of the third region in the image photographed by the second camera;
obtain a third region of the second image based on the second physical design parameter;
obtain an image receiving region Q of an image sensor in the second camera; and determine, as the second sub-image, an image of a region S2 that is an intersection set between the third region of the second image and Q.

14. The apparatus according to claim 13, wherein the one or more processors is further configured to implement any one of the following three manners:
manner 1: determining an image of a region S3 that is an intersection set between an image of a region S1 and an image of a region S2;
determine an image of a region S32 that is a complementary set of S3 in S2; and
perform fusion processing on the image of S1 and the image of S32, to obtain the target image; or
manner 2: determining an image of a region S3that is an intersection set between an image of region S1 and an image of region S2;
determining an image of a region S31 that is a complementary set of S3 in S1; and
perform fusion processing on the image of S31 and the image of S2, to obtain the target image; or
manner 3: determining an image of a region S3 that is an intersection set between an image of region S1 and an image of region S2;
determining an image of a region S31 that is a complementary set of S3 in S1;
determining an image of a region S32 that is a complementary set of S3 in S2;
performing, based on S1 and S2, enhancement processing on S3 according to a preset enhancement algorithm to obtain an image of S4; and
performing fusion processing on the image of S31, the image of S32, and the image of S4 to obtain the target image.

15. The apparatus according to claim 13, wherein the first physical design parameter indicates that:
a modulation transfer function (MTF) value corresponding to an image photographed by the first camera in a field-of-view range of [0, $\theta_1$] at a preset spatial frequency is greater than a preset first threshold; and an MTF value corresponding to an image photographed by the first camera in another field-of-view range at the preset spatial frequency is not greater than the preset first threshold, wherein $\theta_1$ is less than ½ of a field of view of the first camera; and
wherein the second physical design parameter indicates that:
an MTF value corresponding to an image photographed by the second camera in a field-of-view range of [$\theta_2$, $\theta_3$] at the preset spatial frequency is greater than a preset second threshold; and an MTF value corresponding to an image photographed by the second camera in another field-of-view range at the preset spatial frequency is not greater than the preset second threshold, wherein $\theta_3$ is less than ½ of a field of view of the second camera, and $0<\theta_2<\theta_1<\theta_3$.

16. The apparatus according to claim 11, wherein the one or more processors is further configured to adjust the spacing between the first camera and the second camera.

17. A terminal device, comprising:
a first camera;
a second camera;
a memory;
a processor; and
a bus, wherein the first camera, the second camera, the memory, and the processor are coupled via the bus,
wherein optical axes of the first camera and the second camera are parallel to each other, and a spacing between the first camera and the second camera is less than a preset distance, and wherein f-numbers of the first camera and the second camera are less than 1.6, and neither of quantities of lenses of the first camera and the second camera is greater than 6;
wherein the each of the first and second cameras is configured to collect an image signal under a control of the processor;
the memory is configured to store a computer program and an instruction; and
the processor is configured to invoke the computer program and the instruction stored in the memory to perform a method, the method including
obtaining a first image of an object photographed by the first camera;
obtaining a second image of the object photographed by the second camera;
obtaining a first sub-image of the first image, wherein definition of the first sub-image satisfies a preset definition standard;
obtaining a second sub-image of the second image, wherein definition of the second sub-image satisfies the preset definition standard, there is an image intersection set between the first sub-image and the second sub-image, and an image union set between the first sub-image and the second sub-image can represent the object; and
performing fusion processing on the first sub-image and the second sub-image to obtain a target image.

18. The terminal device according to claim 17, further comprising an antenna system, wherein the antenna system receives or sends a wireless communication signal under the control of the processor, to implement wireless communication with a mobile communications network; and wherein the mobile communications network comprises one or more of the following: a GSM network, a CDMA network, a 3G network, an FDMA network, a TDMA network, a PDC network, a TACS network, an AMPS network, a WCDMA network, a TD-SCDMA network, a Wi-Fi network, and an LTE network.

* * * * *